(12) United States Patent
Mehra et al.

(10) Patent No.: US 10,387,303 B2
(45) Date of Patent: Aug. 20, 2019

(54) NON-VOLATILE STORAGE SYSTEM WITH COMPUTE ENGINE TO ACCELERATE BIG DATA APPLICATIONS

(71) Applicant: WESTERN DIGITAL TECHNOLOGIES, INC., San Jose, CA (US)

(72) Inventors: Pankaj Mehra, San Jose, CA (US); Vidyabhushan Mohan, San Jose, CA (US); Seung-Hwan Song, San Jose, CA (US); Dejan Vucinic, San Jose, CA (US); Chao Sun, San Jose, CA (US); Minghai Qin, San Jose, CA (US); Arup De, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 118 days.

(21) Appl. No.: 15/673,143

(22) Filed: Aug. 9, 2017

(65) Prior Publication Data

US 2018/0052766 A1    Feb. 22, 2018

Related U.S. Application Data

(60) Provisional application No. 62/375,866, filed on Aug. 16, 2016.

(51) Int. Cl.
*G06F 12/02* (2006.01)
*G06F 16/2455* (2019.01)
(Continued)

(52) U.S. Cl.
CPC .......... *G06F 12/0238* (2013.01); *G06F 3/061* (2013.01); *G06F 3/0625* (2013.01); *G06F 3/0626* (2013.01); *G06F 3/0659* (2013.01); *G06F 3/0661* (2013.01); *G06F 3/0679* (2013.01); *G06F 3/0688* (2013.01); *G06F 12/0246* (2013.01); *G06F 13/124* (2013.01); *G06F 16/24561* (2019.01);
(Continued)

(58) Field of Classification Search
CPC ............. G06F 12/0238; G06F 12/0246; G06F 16/24561; G06F 16/24553; G06F 13/124; G06F 2212/7201; G06F 3/061; G06F 3/0625; G06F 3/0626; G06F 3/0659; G06F 3/0661; G06F 3/0679; G06F 3/0688; Y02D 10/14; Y02D 10/154
See application file for complete search history.

(56) References Cited

U.S. PATENT DOCUMENTS 6,401,185 B1    6/2002    Sexton
6,446,062 B1    9/2002    Levine
(Continued)

OTHER PUBLICATIONS

International Search Report and Written Opinion dated Jan. 27, 2015, PCT Serial No. PCT/US2014/062066, 9 pages.
(Continued)

*Primary Examiner* — Tracy A Warren
(74) *Attorney, Agent, or Firm* — Vierra Magen Marcus LLP

(57) ABSTRACT

A memory system (e.g. a solid state drive) includes one or more non-volatile memory die, a controller in communication with the memory die and a compute engine inside the memory system that is near the location of the data and can be used to perform common data manipulation operations.

25 Claims, 19 Drawing Sheets

(51) Int. Cl.
*G06F 3/06* (2006.01)
*G06F 13/12* (2006.01)

(52) U.S. Cl.
CPC .......... *G06F 16/24553* (2019.01); *G06F 2212/7201* (2013.01); *Y02D 10/14* (2018.01); *Y02D 10/154* (2018.01)

(56) References Cited

U.S. PATENT DOCUMENTS

| | | | |
|---|---|---|---|
| 6,549,977 B1 | 4/2003 | Horst | |
| 6,856,556 B1 | 2/2005 | Hajeck | |
| 7,055,015 B2 | 5/2006 | Shiota | |
| 7,126,857 B2 | 10/2006 | Hajeck | |
| 7,424,478 B2 | 9/2008 | Licon | |
| 7,430,136 B2 | 9/2008 | Merry, Jr. | |
| 7,447,807 B1 | 11/2008 | Merry | |
| 7,502,256 B2 | 3/2009 | Merry, Jr. | |
| 7,509,441 B1 | 3/2009 | Merry | |
| 7,596,643 B2 | 9/2009 | Merry, Jr. | |
| 7,653,778 B2 | 1/2010 | Merry, Jr. | |
| 7,685,337 B2 | 3/2010 | Merry, Jr. | |
| 7,685,338 B2 | 3/2010 | Merry, Jr. | |
| 7,685,374 B2 | 3/2010 | Diggs | |
| 7,733,712 B1 | 6/2010 | Walston | |
| 7,765,373 B1 | 7/2010 | Merry | |
| 7,898,855 B2 | 3/2011 | Merry, Jr. | |
| 7,912,991 B1 | 3/2011 | Merry | |
| 7,930,661 B1* | 4/2011 | Trimberger | G06F 17/5054 716/100 |
| 7,936,603 B2 | 5/2011 | Merry, Jr. | |
| 7,962,792 B2 | 6/2011 | Diggs | |
| 8,078,918 B2 | 12/2011 | Diggs | |
| 8,090,899 B1 | 1/2012 | Syu | |
| 8,095,851 B2 | 1/2012 | Diggs | |
| 8,108,692 B1 | 1/2012 | Merry | |
| 8,122,185 B2 | 2/2012 | Merry, Jr. | |
| 8,127,048 B1 | 2/2012 | Merry | |
| 8,135,903 B1 | 3/2012 | Kan | |
| 8,151,020 B2 | 4/2012 | Merry, Jr. | |
| 8,161,227 B1 | 4/2012 | Diggs | |
| 8,166,245 B2 | 4/2012 | Diggs | |
| 8,243,525 B1 | 8/2012 | Kan | |
| 8,254,172 B1 | 8/2012 | Kan | |
| 8,261,012 B2 | 9/2012 | Kan | |
| 8,296,625 B2 | 10/2012 | Diggs | |
| 8,312,207 B2 | 11/2012 | Merry, Jr. | |
| 8,316,176 B1 | 11/2012 | Phan | |
| 8,341,339 B1 | 12/2012 | Boyle | |
| 8,375,151 B1 | 2/2013 | Kan | |
| 8,392,635 B2 | 3/2013 | Booth | |
| 8,397,107 B1 | 3/2013 | Syu | |
| 8,407,449 B1 | 3/2013 | Colon | |
| 8,423,722 B1 | 4/2013 | Deforest | |
| 8,433,858 B1 | 4/2013 | Diggs | |
| 8,443,167 B1 | 5/2013 | Fallone | |
| 8,447,920 B1 | 5/2013 | Syu | |
| 8,458,435 B1 | 6/2013 | Rainey, III | |
| 8,478,930 B1 | 7/2013 | Syu | |
| 8,489,854 B1 | 7/2013 | Colon | |
| 8,503,237 B1 | 8/2013 | Horn | |
| 8,521,972 B1 | 8/2013 | Boyle | |
| 8,549,236 B2 | 10/2013 | Diggs | |
| 8,583,835 B1 | 11/2013 | Kan | |
| 8,601,311 B2 | 12/2013 | Horn | |
| 8,601,313 B1 | 12/2013 | Horn | |
| 8,612,669 B1 | 12/2013 | Syu | |
| 8,612,804 B1 | 12/2013 | Kang | |
| 8,615,681 B2 | 12/2013 | Horn | |
| 8,634,247 B1 | 1/2014 | Sprouse | |
| 8,638,602 B1 | 1/2014 | Horn | |
| 8,639,872 B1 | 1/2014 | Boyle | |
| 8,683,113 B2 | 3/2014 | Abasto | |
| 8,700,834 B2 | 4/2014 | Horn | |
| 8,700,950 B1 | 4/2014 | Syu | |
| 8,700,951 B1 | 4/2014 | Call | |
| 8,706,985 B1 | 4/2014 | Boyle | |
| 8,707,104 B1 | 4/2014 | Jean | |
| 8,713,066 B1 | 4/2014 | Lo | |
| 8,713,357 B1 | 4/2014 | Jean | |
| 8,719,531 B2 | 5/2014 | Strange | |
| 8,724,422 B1 | 5/2014 | Agness | |
| 8,725,931 B1 | 5/2014 | Kang | |
| 8,745,277 B2 | 6/2014 | Kan | |
| 8,751,728 B1 | 6/2014 | Syu | |
| 8,769,190 B1 | 7/2014 | Syu | |
| 8,769,232 B2 | 7/2014 | Suryabudi | |
| 8,773,909 B2 | 7/2014 | Li | |
| 8,775,720 B1 | 7/2014 | Meyer | |
| 8,780,632 B2 | 7/2014 | Sprouse | |
| 8,780,634 B2 | 7/2014 | Li | |
| 8,782,327 B1 | 7/2014 | Kang | |
| 8,788,778 B1 | 7/2014 | Boyle | |
| 8,788,779 B1 | 7/2014 | Horn | |
| 8,788,880 B1 | 7/2014 | Gosla | |
| 8,793,429 B1 | 7/2014 | Call | |
| 8,817,541 B2 | 8/2014 | Li | |
| 8,924,661 B1 | 12/2014 | Shachar | |
| 9,003,109 B1 | 4/2015 | Lam | |
| 9,105,333 B1 | 8/2015 | Hu | |
| 9,330,143 B2 | 5/2016 | Obukhov | |
| 2002/0116457 A1 | 8/2002 | Eshleman | |
| 2002/0178328 A1 | 11/2002 | Honda | |
| 2004/0225831 A1 | 11/2004 | Pail | |
| 2006/0143238 A1 | 6/2006 | Tamatsu | |
| 2007/0204128 A1 | 8/2007 | Lee | |
| 2008/0071785 A1 | 3/2008 | Kabra | |
| 2008/0140918 A1 | 6/2008 | Sutardja | |
| 2009/0138654 A1 | 5/2009 | Sutardja | |
| 2009/0288101 A1 | 11/2009 | Gandin | |
| 2010/0088572 A1* | 4/2010 | Ohnuki | G06F 9/30105 714/755 |
| 2010/0174849 A1 | 7/2010 | Walston | |
| 2010/0250793 A1 | 9/2010 | Suy | |
| 2011/0099323 A1 | 4/2011 | Syu | |
| 2011/0283049 A1 | 11/2011 | Kang | |
| 2011/0296440 A1 | 12/2011 | Laurich | |
| 2012/0179869 A1 | 7/2012 | Flynn | |
| 2012/0221534 A1 | 8/2012 | Gao | |
| 2012/0260020 A1 | 10/2012 | Suryabudi | |
| 2012/0278531 A1 | 11/2012 | Horn | |
| 2012/0284460 A1 | 11/2012 | Guda | |
| 2012/0324191 A1 | 12/2012 | Strange | |
| 2013/0132638 A1 | 5/2013 | Horn | |
| 2013/0145106 A1 | 6/2013 | Kan | |
| 2013/0265825 A1 | 10/2013 | Lassa | |
| 2013/0290793 A1 | 10/2013 | Booth | |
| 2014/0059405 A1 | 2/2014 | Syu | |
| 2014/0101369 A1 | 4/2014 | Tomlin | |
| 2014/0115427 A1 | 4/2014 | Lu | |
| 2014/0133220 A1 | 5/2014 | Danilak | |
| 2014/0136753 A1 | 5/2014 | Tomlin | |
| 2014/0149826 A1 | 5/2014 | Lu | |
| 2014/0157078 A1 | 6/2014 | Danilak | |
| 2014/0181432 A1 | 6/2014 | Horn | |
| 2014/0215129 A1 | 7/2014 | Kuzmin | |
| 2014/0223255 A1 | 8/2014 | Lu | |
| 2015/0356010 A1* | 12/2015 | Bolanowski | G06F 13/1668 711/103 |
| 2016/0011815 A1* | 1/2016 | Klein | G06F 3/0644 714/6.12 |
| 2016/0266848 A1* | 9/2016 | Lam | G06F 3/0688 |
| 2016/0357630 A1* | 12/2016 | Kang | G11C 5/025 |
| 2017/0255390 A1* | 9/2017 | Chang | G06F 3/0605 |
| 2017/0300263 A1* | 10/2017 | Helmick | G06F 3/0625 |

OTHER PUBLICATIONS

De, et al., "Minerva: Accelerating Data Analysis in Next-Generation SSDs," FCCM '13 Proceedings of the 2013 IEEE 21st Annual International Symposium on Field-Programmable Custom Computing Machines, pp. 9-16, Apr. 28-30, 2013.

Ki, "In-Storage Compute: an Ultimate Solution for Accelerating I/O-intensive Applications," Samsung Electronics, Aug. 13, 2015.

(56) References Cited

OTHER PUBLICATIONS

Tiwari, et al., "Active Flash: Towards Energy-Efficient, In-Situ Data Analytics on Extreme-Scale Machines," FAST'13 Proceedings of the 11th USENIX conference on File and Storage Technologies, pp. 119-132, San Jose, CA, Feb. 12-15, 2013.
Tseng, et al., "Morpheus: Creating Application Objects Efficiently for Heterogeneous Computing," ISCA '16 Proceedings of the 43rd International Symposium on Computer Architecture, pp. 53-65, Seoul, Republic of Korea, Jun. 18-22, 2016.
PCT International Search Report dated Nov. 6, 2017, PCT Patent Application No. PCT/US2017/046211.
PCT Written Opinion of the International Search Report dated Nov. 6, 2017, PCT Patent Application No. PCT/US2017/046211.

\* cited by examiner

US 10,387,303 B2

NON-VOLATILE STORAGE SYSTEM WITH COMPUTE ENGINE TO ACCELERATE BIG DATA APPLICATIONS

This application claims the benefit of U.S. Provisional Application 62/375,866, "Non-Volatile Storage System With Compute Engine To Accelerate Big Data Applications," filed on Aug. 16, 2016.

BACKGROUND

Non-volatile semiconductor memory is used in solid state drives (SSD). As Internet-scale services continue to grow, real time data processing and data analytics by ad-hoc queries on large volumes of data is emerging as a critical application. Additionally, as memory density continues to scale, SSD capacities continue to scale exponentially. Current enterprise systems are ill-equipped to manage these trends as they rely on moving huge volumes of data out into a system's main memory for processing. These solutions rely on storing data at one location (i.e. a storage device like an SSD) and move data to a different location (typically DRAM) for computation. While this method works for some applications with limited data sizes, applications with large scale data cannot use this method because of the time wasted on transferring data and the prohibitively high cost and power consumption of including large scale (e.g. petabyte) DRAM capacity in such systems.

BRIEF DESCRIPTION OF THE DRAWINGS

Like-numbered elements refer to common components in the different figures.

DETAILED DESCRIPTION

Figure 1:
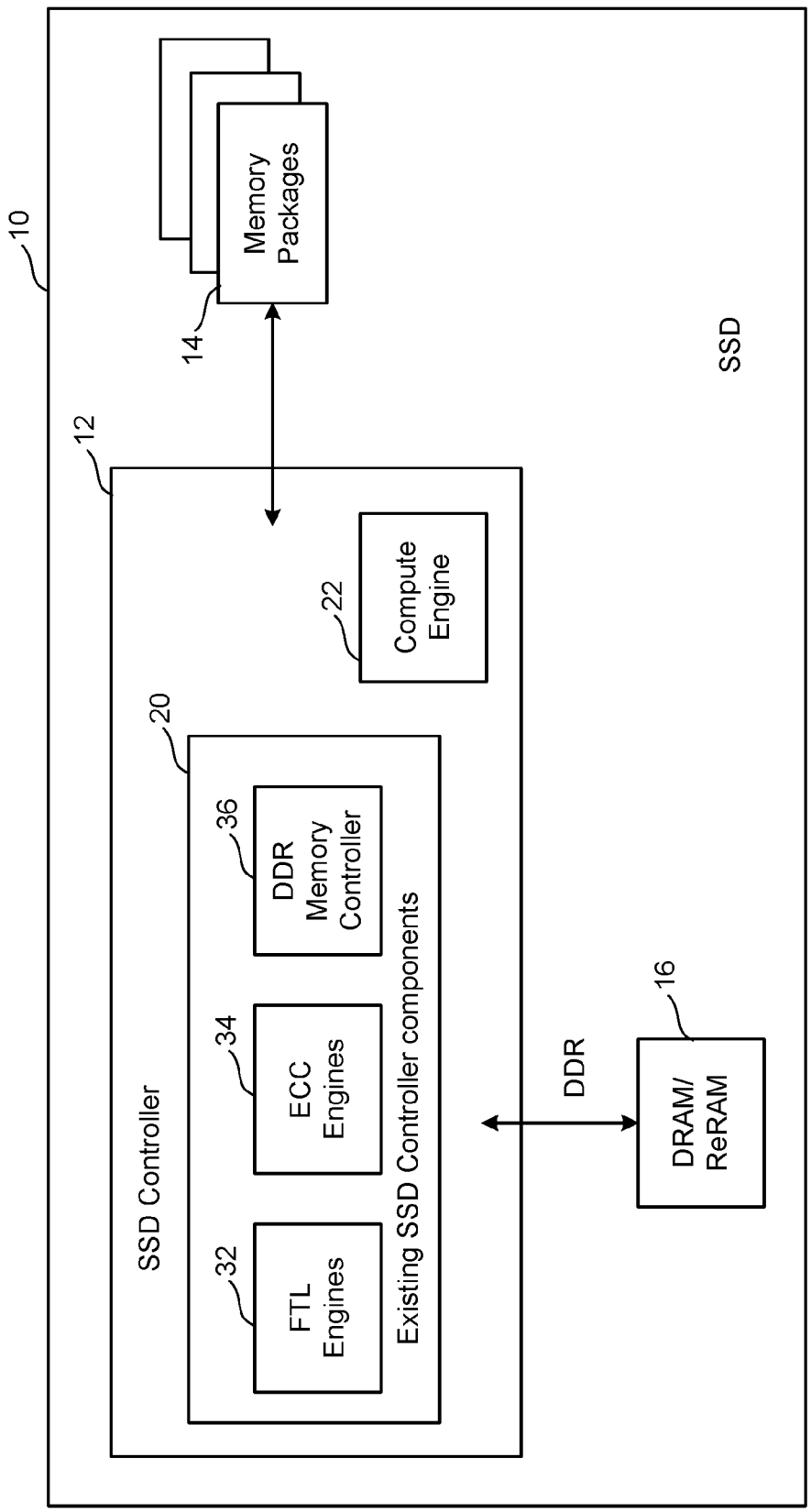
FIG. 1 is a block diagram of one embodiment of a solid state drive that comprises a Controller, non-volatile memory for storing data and a compute engine near the location of the data that can be used to perform common data manipulation operations.

A solid state drive ("SSD"), or other memory system, is proposed that can accelerate performance of big data applications using an hardware accelerator based approach that involves integrating compute components near the location of the data that can be used to perform common data manipulation operations such as scan, filter, aggregate, and join (and other operations). Application Programming Interfaces ("APIs") can be exposed by the memory system (e.g., exposed by the Controller) and used by the host application to perform efficient data processing. This proposal employs an accelerator based approach. Rather than package the data to be processed as a container and ship to a general purpose CPU core, the proposed accelerator based approach has the computation performed near the location of the data.

For example, cores/hardware-accelerators are targeted directly for example by a Just-In-Time compiler. Uncompiled code can be transmitted from the host to the memory system via an API. At the memory system, a Just-In-Time compiler (implemented on the Controller) performs compilation during execution of a program (at run time) rather than prior to execution. Most often this consists of translation of the uncompiled code to machine code, which is then executed directly by a local computer engine.

A memory system (e.g., a SSD) is proposed that includes one or more non-volatile memory die, a controller in communication with the one or more non-volatile memory die and a compute engine inside the system that can search, sort and perform other operations on data stored in the memory die. In one embodiment, the compute engine is a hardware accelerator comprising dedicated hardware (e.g., an electrical circuit) without any software, or can be an FPGA. In one embodiment, the compute engine is implemented in each of the one or more non-volatile memory die. In some embodiments, the compute engine can include a combination of hardware and software.

Server farms comprise hundreds or thousands of servers to support Internet applications. In one embodiments, the servers each include one or more SSDs that use the technology described herein. Although the embodiments discussed below are SSDs, the technology described herein applies to different types of non-volatile storage devices.

As the compute operations move closer to data, the available compute-to-data bandwidth increases significantly. For example, compared to conventional systems where compute is located on the host side of the I/O interface (and outside the SSD), integrating compute operations within an SSD can provide 1.5x-3.75x higher bandwidth, even as NAND architecture and I/O interfaces continue to scale. Similarly, even closer integration with the bits—by moving the compute within a memory package or within a memory die—can provide an additional 2.5x-13x increase in bandwidth available to the compute engine in future generations of NAND memory, assuming the adoption of advanced packaging techniques.

A compute engine is a hardware circuit that can be one or more of the following:

1. Hardware accelerator for data access and manipulation operations such as filtering, aggregation, compression/decompression, sorting, grouping, and joining tabular or other forms of data;

2. General purpose CPU core such as ARM/ARC/Intel Atom; and/or

3. Reconfigurable hardware circuitry such as FPGAs.

Unlike other components in an SSD that primarily facilitate reading/writing data from/to the SSD, a compute engine manipulates the contents of the data. For example, it can search a stream of data looking for a specific key (a set of bytes) or can sort the data in some order as specified by the host. The concept of compute engines includes but is not limited to compression/decompression engines sometimes available in SSDs.

In the designs considered below, a memory package refers to a structure that contains one or more memory dies (e.g., NAND flash memory dies, ReRAM dies, both NAND and ReRAM, or other non-volatile technologies). The term memory package can also refer to managed memory—i.e. a memory package that contains one or more memory dies with an embedded error correction code ("ECC") engine/controller to correct errors detected during read operations to the memory.

FIG. 1 is a block diagram of one embodiment of SSD 10 that comprises a Controller (SSD Controller) 12, non-volatile memory packages 14 for storing data, DRAM/ReRAM 16, and a compute engine 22 near the location of the data that can be used to perform common data manipulation operations. FIG. 1 presents a high-level design where the compute engine 22 is integrated within the SSD Controller 12. The compute engine 22 can be, for instance, an ASIC that is part of the SSD Controller system on a chip ("SoC"), or can be integrated (deeper) as a hardware circuit within the SSD controller. FIG. 1 shows the SSD Controller 12, a SoC, including existing SSD Controller components that comprise FTL engines 32, ECC engines 34, and DDR memory controller 36 for controlling DRAM/ReRAM 16. Included within that SSD Controller 12 is the new proposed compute engine 22 that can be used to perform compute operations on data stored in the non-volatile memory of the memory packages. Examples of the compute operations include scanning the data, searching, filtering, sorting, aggregating data, joining data together, as well as other functions on the data. FIG. 1 shows the SSD Controller 12 in communication with DRAM/ReRAM 16 and in communication with the set of one or more memory packages 14. In one embodiment, the SSD Controller 12 communicates with the memory packages (and/or memory die) using a Toggle Mode interface, which is an asynchronous interface that is able to communicate 32 GB/s. An alternative embodiment could use ONFI interface (Open NAND Flash Interface), which is synchronous and makes use of a clock.

The memory packages include one or more memory die. In one embodiment, each memory die will include its own chip enable that can be controlled by SSD Controller 12. In other embodiments, multiple memory die may share a chip enable, requiring SSD Controller 12 to use addressing to select between the memory die that share a chip enable. In one embodiment, the memory die in the memory packages 14 utilize NAND flash memory. In other embodiments, the memory package can include cross point ReRAM non-volatile memory, which is discussed below.

Figure 2:
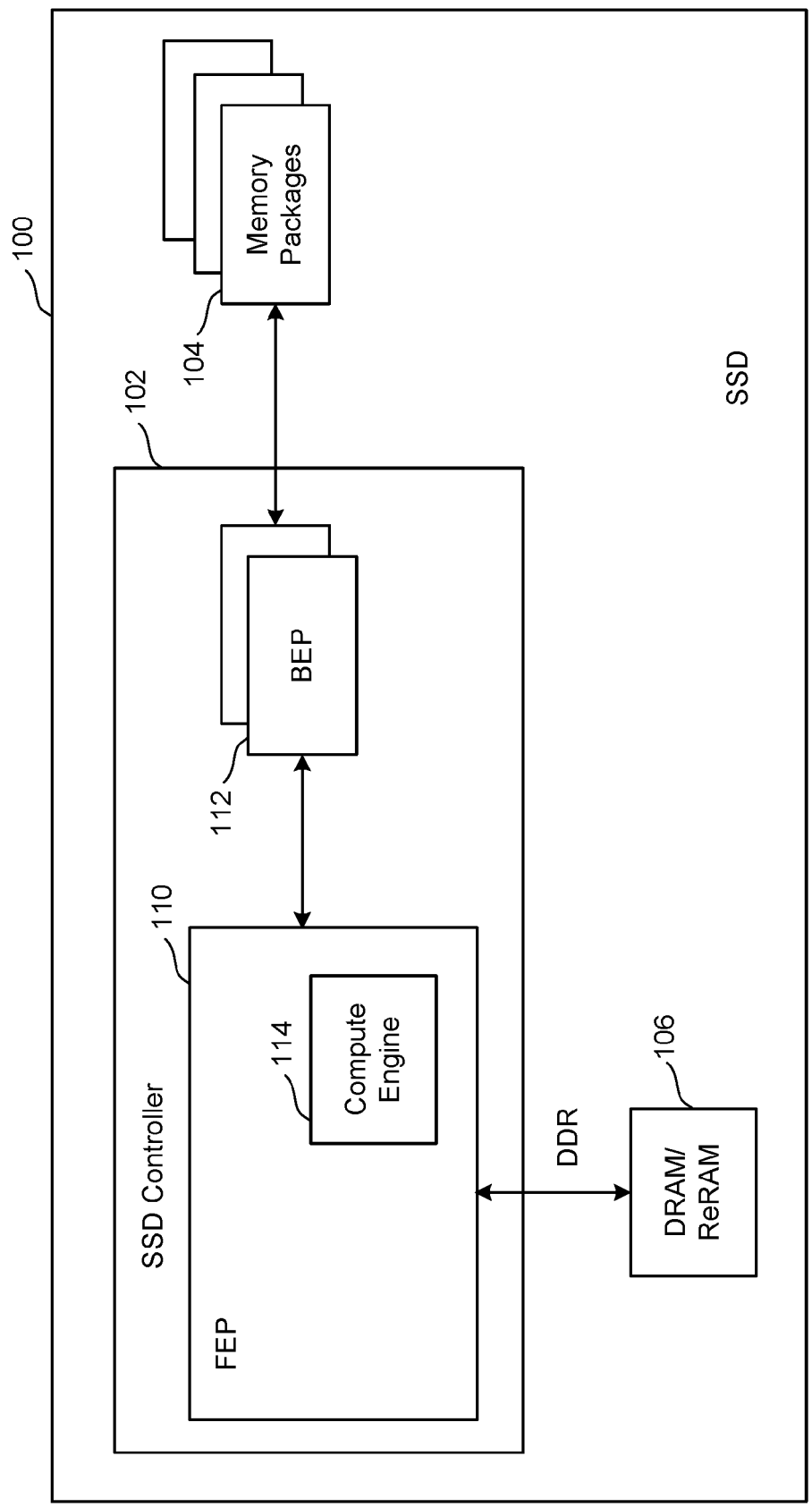
FIG. 2 is a block diagram of one embodiment of a solid state drive that comprises a Controller, non-volatile memory for storing data and a compute engine near the location of the data that can be used to perform common data manipulation operations.

FIG. 2 is a block diagram of one embodiment of a solid state drive 100 that comprises a controller 102, non-volatile memory 104 for storing data, DRAM/ReRAM 106 and a compute engine 114 near the location of the data that can be used to perform common data manipulation operations. The embodiment of FIG. 2 includes an SSD controller 102 comprising a Front End Processor Circuit (FEP) 110 and one or more Back End Processor Circuits (BEP) 112. In one embodiment the FEP 110 circuit is implemented on an ASIC. In one embodiment, each BEP circuit 112 is implemented on a separate ASIC. The ASICs for each of the BEP circuits 112 and the FEP circuit 110 are implemented on the same semiconductor such that the SSD controller 102 is manufactured as a SoC. FEP 110 and BEP 112 both include their own processors. In one embodiment, FEP 110 and BEP 112 work as a master slave configuration where the FEP 110 is the master and each BEP 112 is a slave. For example, FEP circuit 110 implements a flash translation layer, including performing memory management (e.g., garbage collection, wear leveling, etc.), logical to physical address translation, communication with the host, management of DRAM (local volatile memory) and management the overall operation of the SSD (or other non-volatile storage system). The BEP circuit 112 manages memory operations in the memory packages/die at the request of FEP circuit 110. For example, the BEP circuit 112 can carry out the read, erase and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages. FIG. 2 shows the FEP circuit 110 in communication with each of the BEP circuits 112 at a bandwidth of 4 GB/s. In the implementation of FIG. 2, the compute engine 114 is designed in as a hardware circuit within FEP 110. The compute engine can access high speed, high-bandwidth memory using the DDR interface to access the DRAM 106. In this implementation, the bandwidth available to the compute engine is limited by the bandwidth that connects the FEP 110 to the BEP 112.

Figure 3:
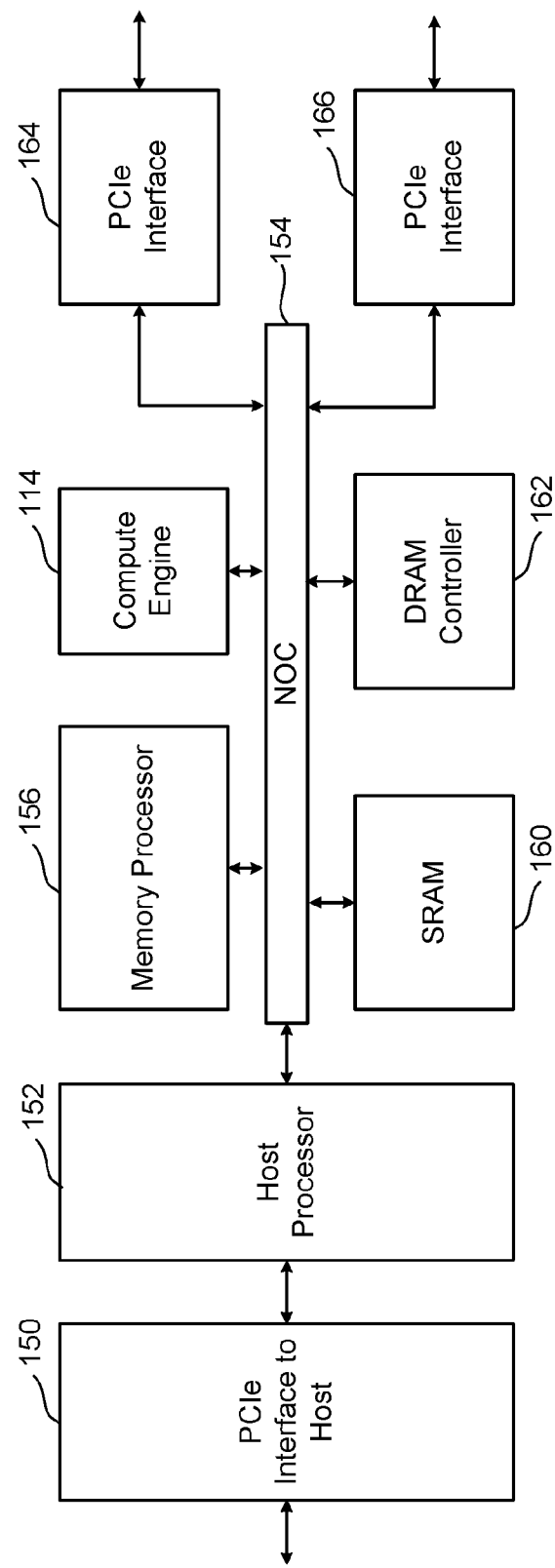
FIG. 3 is a block diagram of one embodiment of a Front End Processor Circuit with a compute engine. The Front End Processor Circuit is part of a Controller.

FIG. 3 is a block diagram of one embodiment of an FEP circuit with the compute engine 114 designed into the circuit. The FEP circuit of FIG. 3 is one example implementation of FEP circuit 110 of FIG. 2. FIG. 3 shows a PCIe interface 150 to communicate with the host and a host processor 152 in communication with that PCIe interface. The host processor 152 can be any type of processes known in the art that is suitable for the implementation. The host processor 152 is in communication with a network-on-chip (NOC) 154. An NOC is a communication subsystem on an integrated circuit, typically between cores in a SoC. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, an NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, the compute engine 114, SRAM 160 and a DRAM controller 162. The DRAM controller 162 is used to operate and communicate with the DRAM (e.g., DRAM 106). SRAM 160 is local RAM memory used by the compute engine 114 or the memory processor 156. The memory processor 156 is used to run the FEP circuit and perform the various memory operations. Also in communication with the NOC are two PCIe Interfaces 164 and 166. In the embodiment of FIG. 3, the SSD controller will include two BEP circuits; therefore there are two PCIe Interfaces 164/166. Each PCIe Interface communicates with one of the BEP circuits. In other embodiments, there can be more or less than two BEP circuits; therefore, there can be more than two PCIe Interfaces. In these arrangements, the compute engine 114 is positioned (from the perspective of the host) behind the interface 150 to the host (e.g., on the memory system side of the interface to the host) and behind the API exposed by the Controller (e.g., exposed by the FEP circuit).

Figure 4:
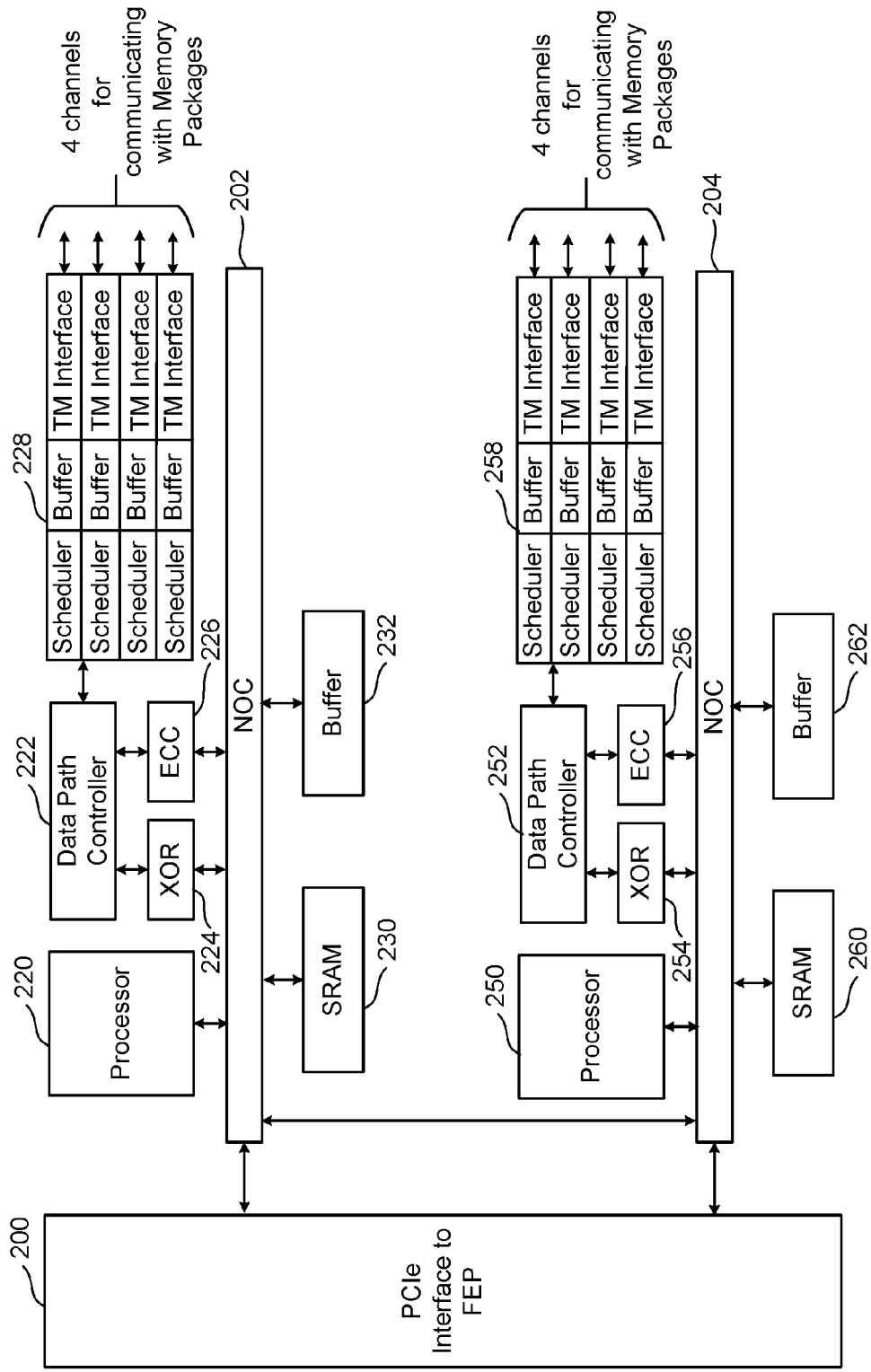
FIG. 4 is a block diagram of one embodiment of a Back End Processor Circuit. In some embodiments, the Back End Processor Circuit is part of a Controller.

FIG. 4 is a block diagram of one embodiment of the BEP circuit. The BEP circuit of FIG. 4 is one example implementation of BEP circuit 112 of FIG. 2. FIG. 4 shows a PCIe Interface 200 for communicating with the FEP circuit (e.g., communicating with one of PCIe Interfaces 164 and 166 of FIG. 3). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art. The XOR engines 224/254 are used to XOR the data so that data can be combined and stored in a manner that can be recovered in case there is a programming error. The data path controller is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. Each interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits.

Figure 5:
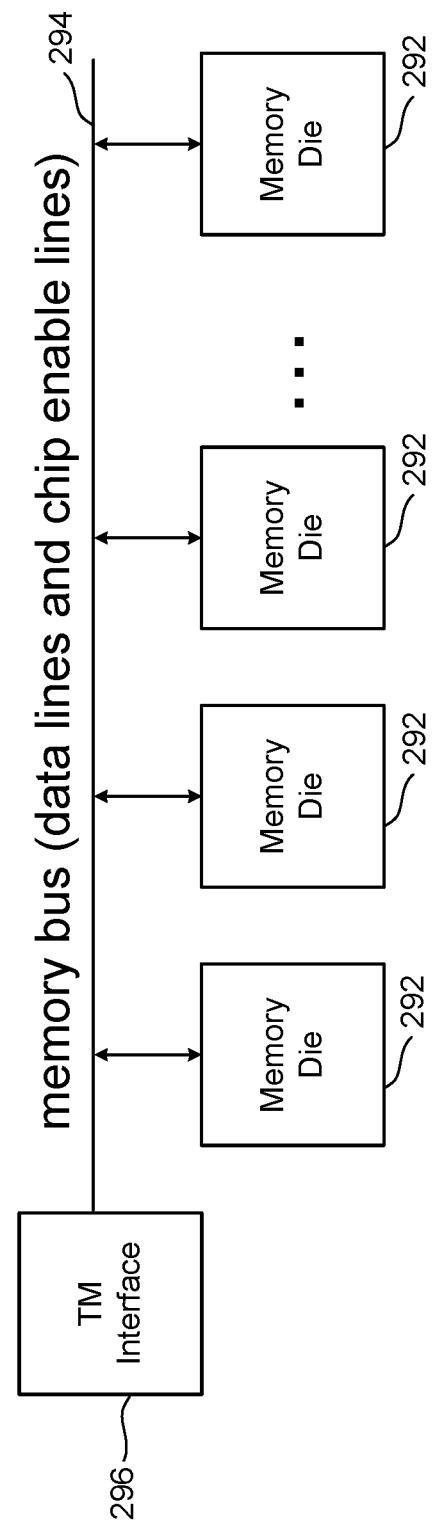
FIG. 5 is a block diagram of one embodiment of a memory package.

FIG. 5 is a block diagram of one embodiment of a memory package. For example, the memory package of FIG. 5 is an example implementation of a memory package included in memory packages 14 of FIG. 1 or memory packages 104 of FIG. 2. FIG. 5 shows a plurality of memory die 292 connected to a memory bus (data lines and chip enable lines) 294. The memory bus 294 connects to a Toggle Mode Interface 296 for communicating with the TM Interface of an BEP circuit (see e.g. FIG. 4). In some embodiments, the memory package can include a small controller connected to the memory bus and the TM Interface. The memory package can have one or more memory die. In one embodiment, each memory package includes eight or 16 memory die; however, other numbers of memory die can also be implemented. The technology described herein is not limited to any particular number of memory die.

Figure 6:
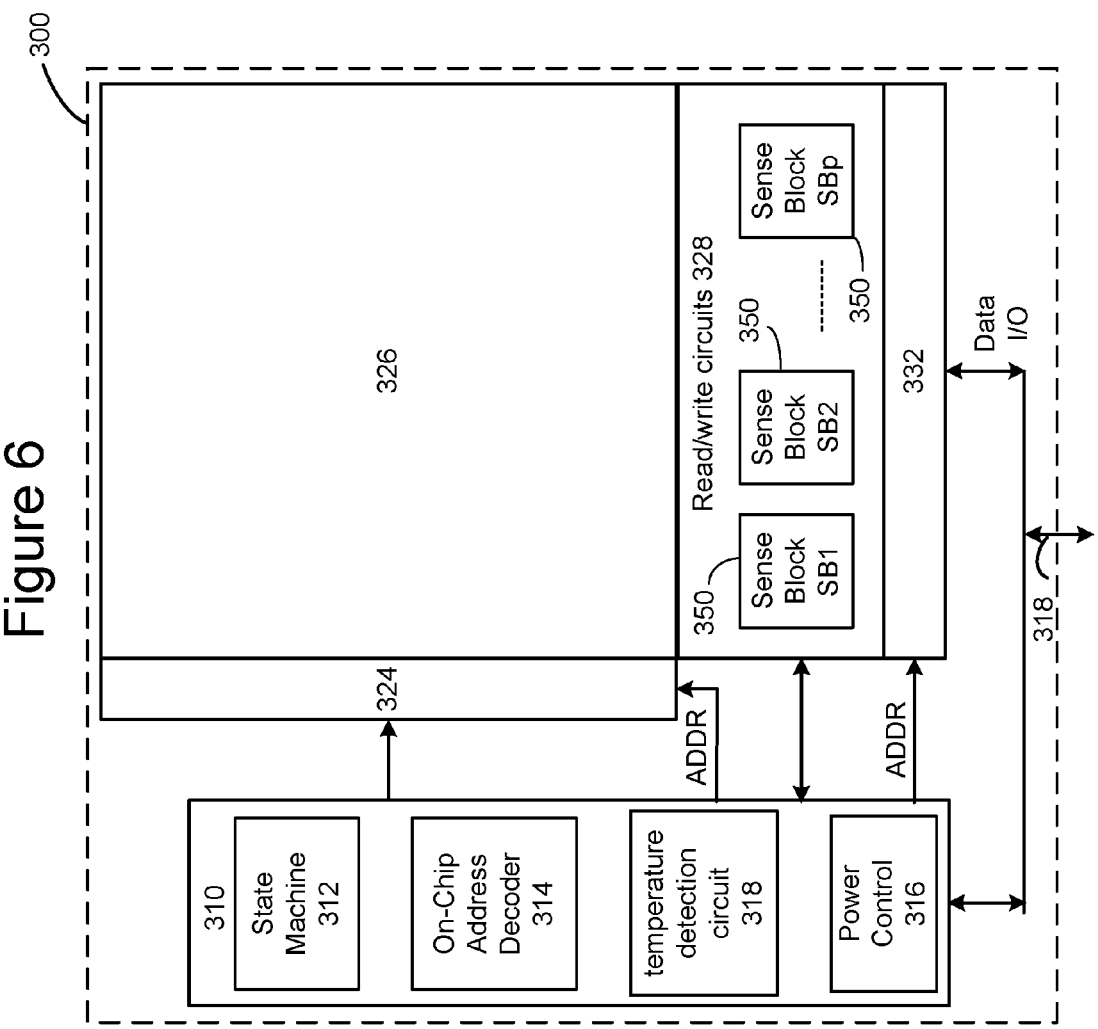
FIG. 6 is a block diagram of one embodiment of a memory die.

FIG. 6 is a functional block diagram of one embodiment of a memory die 300. Note that memory is one example implementation of memory die 292 of FIG. 5. The components depicted in FIG. 6 are electrical circuits. Memory die 300 includes a three dimensional memory structure 326 of memory cells (such as, for example, a 3D array of memory cells), control circuitry 310, and read/write circuits 328. In other embodiments, a two dimensional array of memory cells can be used. Memory structure 326 is addressable by word lines via a row decoder 324 and by bit lines via a column decoder 332. The read/write circuits 328 include multiple sense blocks 350 including SB1, SB2, . . . , SBp (sensing circuitry) and allow a page of memory cells to be read or programmed in parallel. Commands and data are transferred between to/from memory die 300 via lines 318. In one embodiment, memory die 300 includes a set of input and/or output (I/O) pins that connect to lines 318.

Memory structure 326 may comprise one or more arrays of memory cells including a 3D array. The memory structure may comprise a monolithic three dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

Control circuitry 310 cooperates with the read/write circuits 328 to perform memory operations (e.g., erase, program, read, and others) on memory structure 326, and includes a state machine 312, an on-chip address decoder 314, a power control module 316 and a temperature detection circuit 318. The state machine 312 provides die-level control of memory operations. Temperature detection circuit 318 (which is on memory die 300) is configured to detect temperature at the memory structure 326, and can be any suitable temperature detection circuit known in the art. In one embodiment, state machine 312 is programmable by software. In other embodiments, state machine 312 does not use software and is completely implemented in hardware (e.g., electrical circuits). In one embodiment, control circuitry 310 includes registers, ROM fuses and other storage devices for storing default values such as base voltages and other parameters.

The on-chip address decoder 314 provides an address interface between addresses used by a host or controller to the hardware address used by the decoders 324 and 332. Power control module 316 controls the power and voltages supplied to the word lines and bit lines during memory operations. It can include drivers for word line layers (discussed below) in a 3D configuration, select transistors (e.g., SGS and SGD transistors, described below) and source lines. Power control module 316 may include charge pumps for creating voltages. The sense blocks include bit line drivers.

Multiple memory elements in memory structure 326 may be configured so that they are connected in series or so that each element is individually accessible. By way of non-limiting example, flash memory devices in a NAND configuration (NAND flash memory) typically contain memory elements connected in series. A NAND string is an example of a set of series-connected memory cells and select gate transistors that can be used to implement memory structure 326 as a three-dimensional memory structure.

A NAND flash memory array may be configured so that the array is composed of multiple NAND strings of which a NAND string is composed of multiple memory cells sharing a single bit line and accessed as a group. Alternatively, memory elements may be configured so that each element is individually accessible, e.g., a NOR memory array. NAND and NOR memory configurations are exemplary, and memory cells may be otherwise configured.

The memory cells may be arranged in the single memory device in an ordered array, such as in a plurality of rows and/or columns. However, the memory elements may be arrayed in non-regular or non-orthogonal configurations, or in structures not considered arrays.

A three dimensional memory array is arranged so that memory cells occupy multiple planes or multiple memory device levels, thereby forming a structure in three dimensions (i.e., in the x, y and z directions, where the z direction is substantially perpendicular and the x and y directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in they direction) with each column having multiple memory cells. The vertical columns may be arranged in a two dimensional configuration, e.g., in an x-y plane, resulting in a three dimensional arrangement of memory cells, with memory cells on multiple vertically stacked memory planes. Other configurations of memory elements in three dimensions can also constitute a three dimensional memory array.

By way of non-limiting example, in a three dimensional NAND memory array, the memory elements may be coupled together to form vertical NAND strings with charge-trapping material that traverse across multiple horizontal memory device levels. One example of a three dimensional NAND memory array that can be used to implement memory structure 126 can be found in U.S. Pat. No. 9,343,156, incorporated herein by reference in its entirety.

Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

A person of ordinary skill in the art will recognize that the technology described herein is not limited to a single specific memory structure, but covers many relevant memory structures within the spirit and scope of the technology as described herein and as understood by one of ordinary skill in the art.

Although an example memory system is a three dimensional memory structure that includes vertical NAND strings with charge-trapping material, other (2D and 3D) memory structures can also be used with the technology described herein. For example, floating gate memories (e.g., NAND-type and NOR-type flash memory), ReRAM memories, magnetoresistive memory (e.g., MRAM), and phase change memory (e.g., PCRAM) can also be used.

One example of a ReRAM memory includes reversible resistance-switching elements arranged in cross point arrays accessed by X lines and Y lines (e.g., word lines and bit lines). One example of a three dimensional memory array that can be used to implement memory structure 126 can be found in U.S. Patent Application 2016/0133836, "High Endurance Non-Volatile Storage," incorporated herein by reference in its entirety.

In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. This configuration is known as a spin valve and is the simplest structure for an MRAM bit. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCRAM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage light, or other wave.

Figure 7:
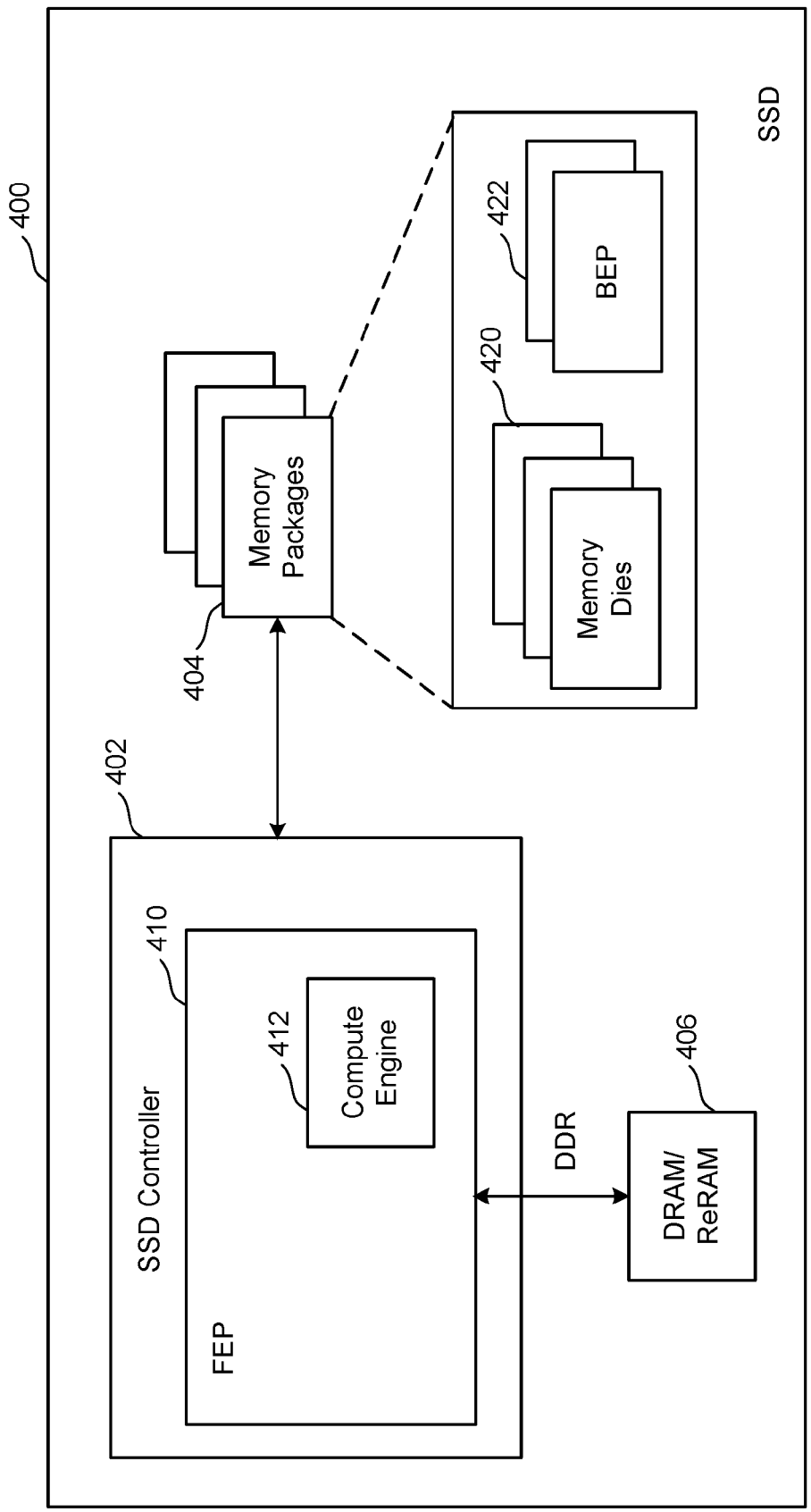
FIG. 7 is a block diagram of one embodiment of a solid state drive that comprises a Controller, non-volatile memory for storing data and a compute engine near the location of the data that can be used to perform common data manipulation operations.

FIG. 7 is a block diagram of one embodiment of a solid state drive 400 that comprises a controller 402, non-volatile memory packages 404 for storing data, DRAM/ReRAM 406, and a compute engine 412 near the location for that data that can be used to perform common data manipulation operations. Controller 402 includes FEP circuit 410. In the embodiment of FIG. 7, compute engine 412 is integrated within FEP circuit 410 and the one or more BEP circuits 422 are now incorporated within the memory packages 404. In this implementation, the SSD controller contains only one ASIC, for the FEP circuit. That is, the SSD controller 402 is in communication with the memory packages 404, where each memory package includes multiple memory die 420 and one or more BEP circuits 422. One example embodiment of memory die 420 is depicted in FIG. 6. One example of BEP circuit 422 is depicted in FIG. 4. One example of FEP circuit 410 with an integrated compute engine 412 is depicted in FIG. 3.

Figure 8:
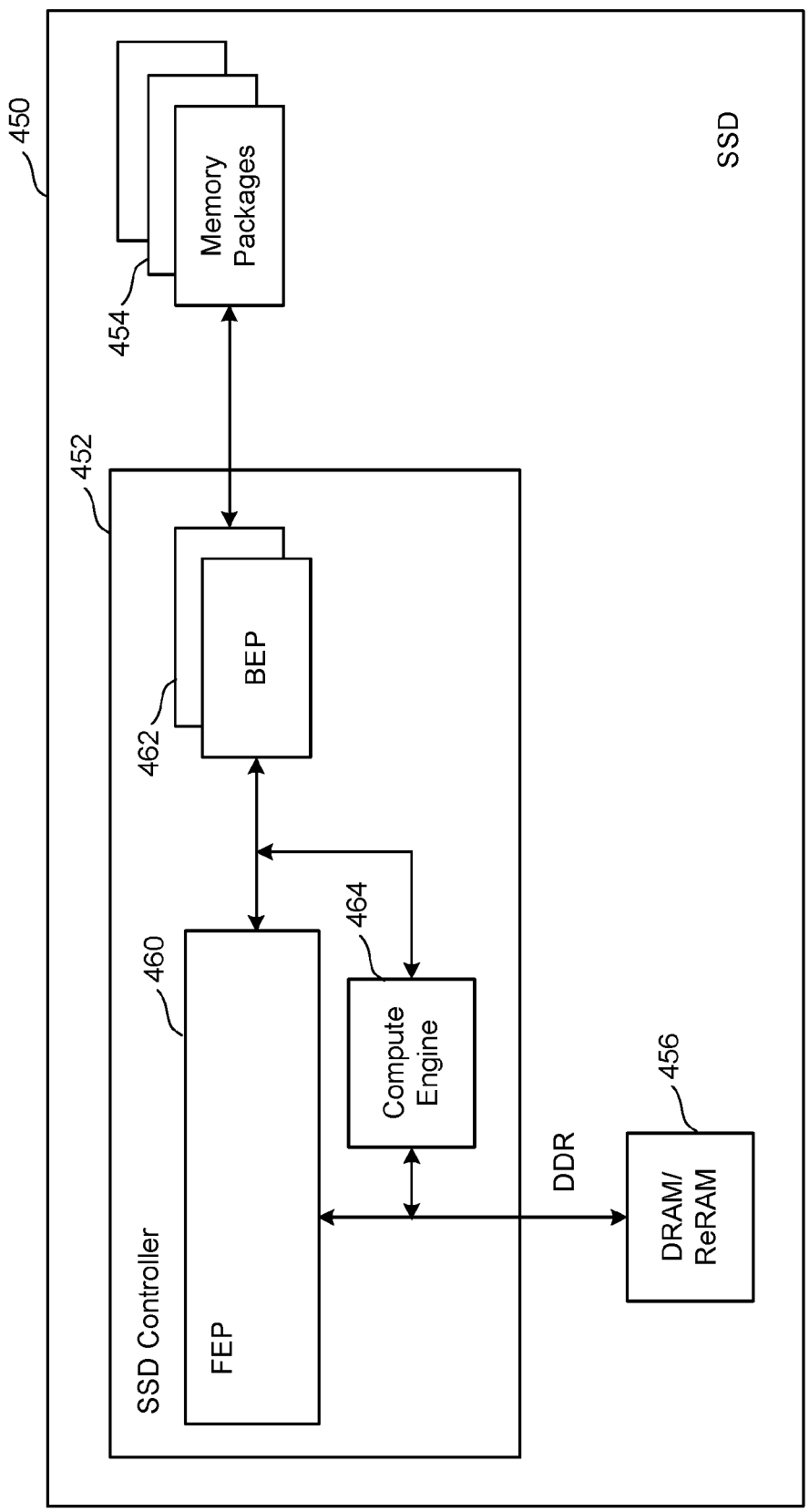
FIG. 8 is a block diagram of one embodiment of a solid state drive that comprises a Controller, non-volatile memory for storing data and a compute engine near the location of the data that can be used to perform common data manipulation operations.

FIG. 8 is a block diagram of one embodiment of a solid state drive 450 that comprises a controller 460, non-volatile memory packages 454 for storing data, DRAM/ReRAM 456, and a compute engine 464 near the location of the data that can be used to perform common data manipulation operations. In the embodiment of FIG. 8 the compute engine 464 is a standalone ASIC (application specific integrated circuit) that is integrated with the SSD controller 460 as a SoC. In this implementation, controller 460 includes a FEP circuit 460 in communication with one or more BEP circuits 462. Compute engine 464 is outside of and connected to FEP circuit 462, connected to the BEP circuit and connected to the high speed DRAM memory with separate interfaces. The bandwidth available to the compute engine 464 is lower than or equal to the bandwidth of the embodiment of FIG. 2. This implementation is preferred when the development of the FEP circuit 462 and the compute engine 464 needs to be kept separate. One example of BEP circuit 422 is depicted in FIG. 4. One example of memory packages 454 is depicted in FIG. 5.

Figure 9:
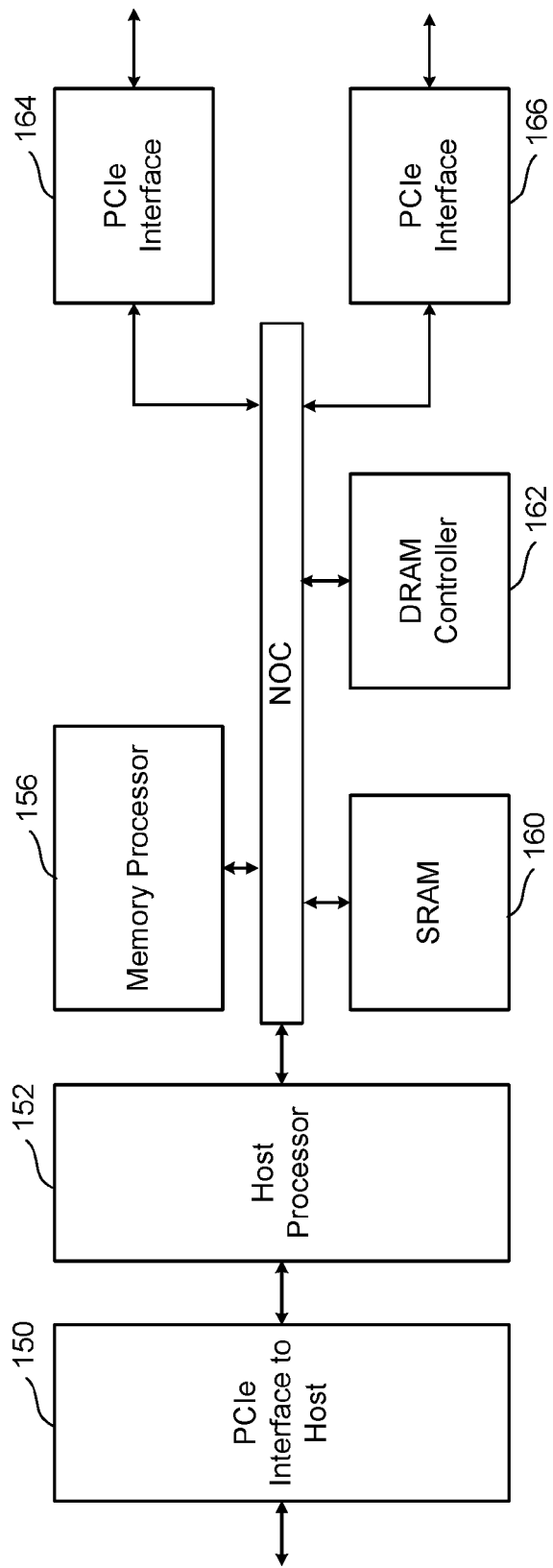
FIG. 9 is a block diagram of one embodiment of a Front End Processor Circuit without a compute engine. In some embodiments, the Front End Processor Circuit is part of a Controller.

FIG. 9 is a block diagram of one embodiment of a FEP circuit without a compute engine, that is suitable for the embodiment of FIG. 8 (e.g., FEP circuit 460). FIG. 9 shows all the components of FIG. 3, but without the compute engine. That is, FIG. 9 depicts PCIe interface 150, host processor 152, NOC 154, memory processor 156, SRAM 160, DRAM controller 162, and PCIe Interfaces 164 and 166. In the embodiment of FIG. 9, the SSD controller will include two BEP circuits; therefore there are two PCIe Interfaces. Each PCIe Interface communicates with one of the BEP circuits. In other embodiments, there can be more or less than two BEP circuits; therefore, there can be more or less than two PCIe Interfaces.

Figure 10:
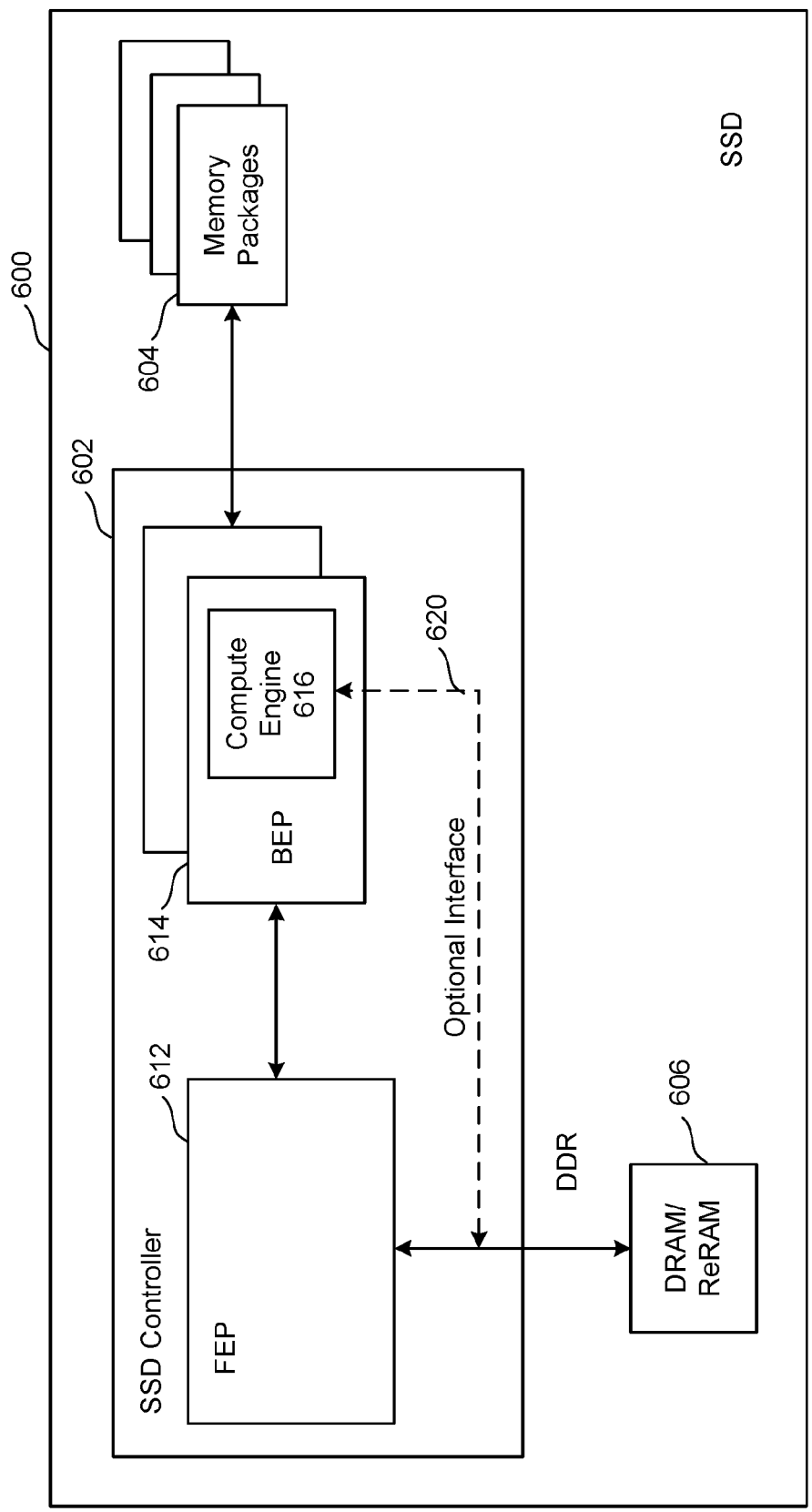
FIG. 10 is a block diagram of one embodiment of a solid state drive that comprises a Controller, non-volatile memory for storing data and a compute engine near the location of the data that can be used to perform common data manipulation operations.

FIG. 10 is a block diagram of one embodiment of a solid state drive 600 that comprises a controller 602, non-volatile memory packages 604 for storing data, DRAM/ReRAM 606, and compute engine 616 near the location of the data that can be used to perform common data manipulation operations. Controller 602 includes a FEP circuit 612 connected to one or more BEP circuits 614. In this embodiment a compute engine 616 is integrated with an BEP circuit 614. That is, the compute engine 616 is implemented in the ASIC for the BEP circuit 614. The bandwidth available to the compute engine is now determined by the number of toggle mode channels present in each BEP circuit and the bandwidth of the toggle mode channels. The BEP circuit 614 may also contain an optional interface 620 to connect to the DRAM/ReRAM chip. A direct interface to the high speed memory provides the compute engine 616 with fast access to the memory to store temporary working data. In the absence of a direct interface, temporary working data is streamed via the interface that connects the BEP circuits to the FEP circuit. One example of FEP circuit 612 is depicted in FIG. 9. One example of memory packages 604 is depicted in FIG. 5.

Figure 11:
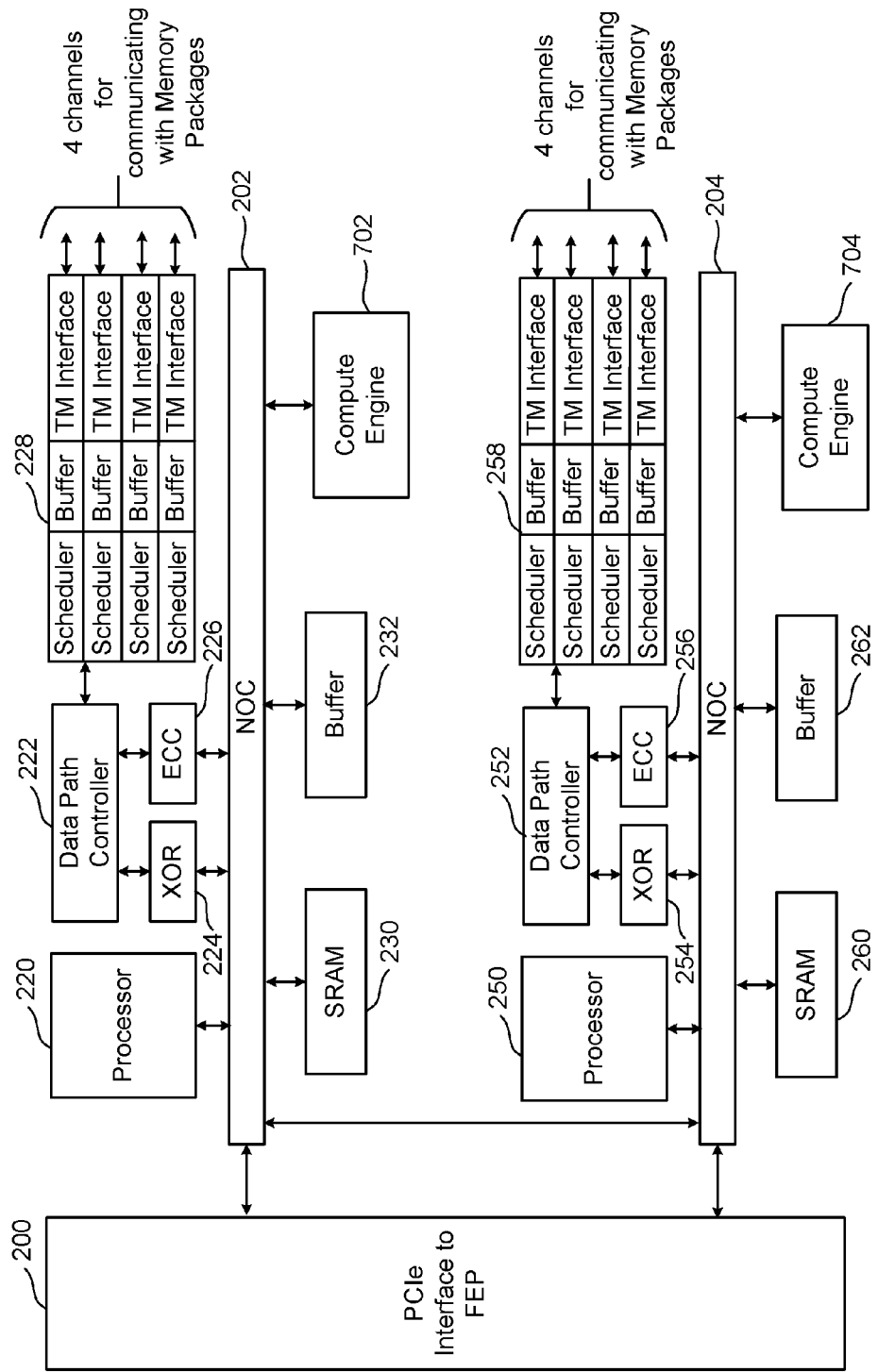
FIG. 11 is a block diagram of one embodiment of a Back End Processor Circuit with a compute engine. In some embodiments, the Back End Processor Circuit is part of a Controller.

FIG. 11 is a block diagram of one embodiment of an BEP circuit that includes a compute engine. The embodiment of the BEP circuit of FIG. 11 is appropriate for use in the embodiment of FIG. 10 (e.g., as an BEP circuit 614). The components of FIG. 11 are the same as the components of FIG. 4, but further includes a compute engine 702 connected to the top NOC 202 and a second compute engine 704 connected to the bottom NOC 204. In another embodiment, one compute engine can connect to both NOCs. In another embodiment, the two NOCs are connected together and the combined NOC will connect to one, two or multiple compute engines. In the embodiment of FIG. 11, there is one compute engine for each set of four channels. In other embodiments, the channels grouped together can include more or less than four channels.

Figure 12:
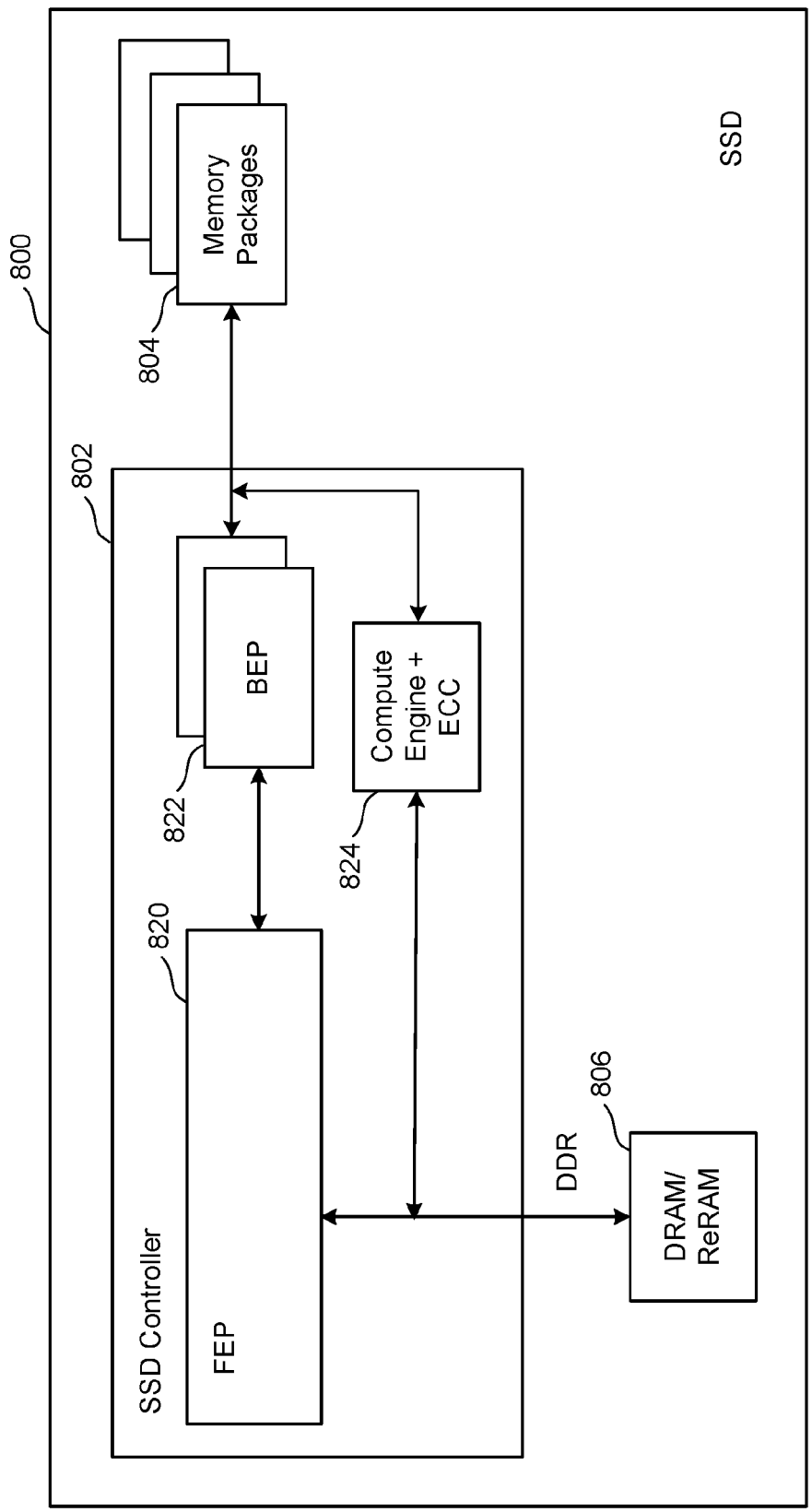
FIG. 12 is a block diagram of one embodiment of a solid state drive that comprises a Controller, non-volatile memory for storing data and a compute engine near the location of the data that can be used to perform common data manipulation operations.

FIG. 12 is a block diagram of one embodiment of a solid state drive 800 that comprises a controller 802, non-volatile memory packages 804 for storing data, DRAM/ReRAM 806 and a compute engine 824 near the location of the data that can be used to perform common data manipulation operations. Controller 802 includes FEP circuit 820 connected to one or more BEP circuits 822. In the embodiment of FIG. 12, compute engine 824 is a standalone ASIC that is connected directly to the toggle mode (TM) channels from the BEP circuits. In such implementations, the compute engine should optionally include an ECC engine in order to decode and correct data read from the flash memory (or other type of nonvolatile memory in the memory packages) before being processed by the compute engine. The compute engine 824 can also be connected to the high speed, high-bandwidth DRAM memory 806 through a standard DDR interface to the DRAM/ReRAM chip and to FEP circuit 820. One example of FEP circuit 820 is depicted in FIG. 9. One example of memory packages 804 is depicted in FIG. 5. One example of BEP circuit 822 is depicted in FIG. 4.

The table below presents properties of the designs presented so far:

| FIG. | Accesses NAND physically/logically (=core relative to FTL) | Encapsulates/ bypasses ECC | Integration locus of core | Available NAND/SCM bandwidth |
|---|---|---|---|---|
| 2, 7 | L | E | FEP | Low |
| 8 | L | E | FEP-BEP interface | Low |
| 10 | P | E | BEP | High |
| 12 | P | B | BEP-NAND interface | High |

The embodiments discussed above show various implementations of integrating the compute engine with the controller. In a different set of implementations, the compute engine can be integrated with the memory package, referred to as memory package level integration.

Figure 13:
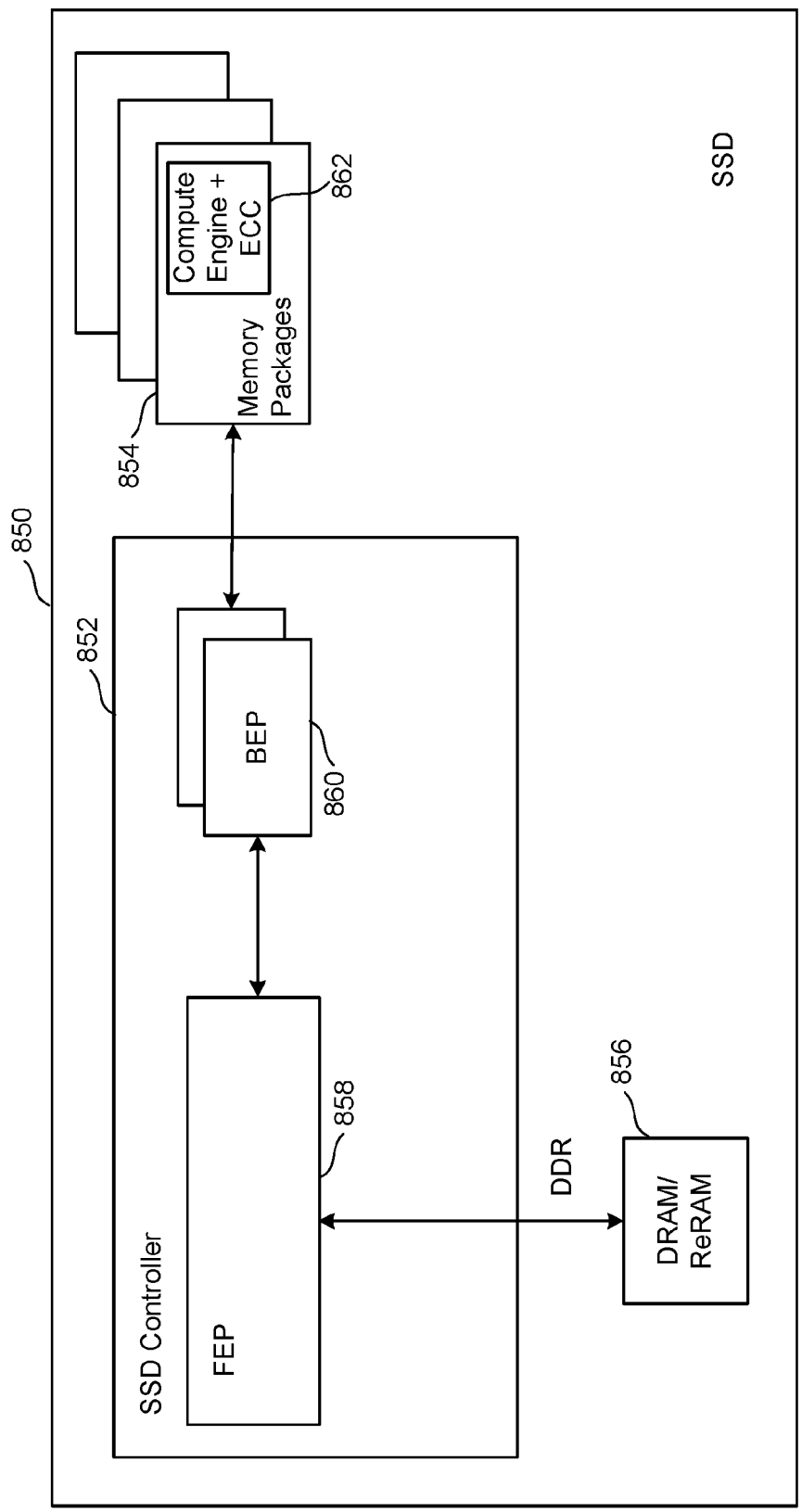
FIG. 13 is a block diagram of one embodiment of a solid state drive that comprises a Controller, non-volatile memory for storing data and a compute engine near the location of the data that can be used to perform common data manipulation operations.

FIG. 13 is a block diagram of one embodiment of a solid state drive 850 that includes memory package level integration, comprising a controller 852, non-volatile memory packages 854 for storing data, DRAM/ReRAM 856 and a compute engine 862 near the location of the data that can be used to perform common data manipulation operations. Controller 852 includes FEP circuit 858 connected to one or more BEP circuits 860. The one or more BEP circuits 860 connect to the non-volatile memory packages 854. One example of FEP circuit 858 is depicted in FIG. 9. One example of BEP circuit 860 is depicted in FIG. 4. In the embodiment depicted in FIG. 13, the compute engine is integrated with each memory package. A memory package which typically includes multiple memory die (e.g., NAND non-volatile memory or other type of non-volatile memory), is now modified to include the compute engine ASIC within the memory package. In one embodiment, the memory package should also include an ECC engine (or at least the decoder portion of the ECC engine) to decode code words read from the memory and to correct the data read from the non-volatile memory die before being processed by the compute engine. Thus, compute engine 862 includes an ECC engine. In other embodiments, the compute engine can operate on data that has not been subjected to ECC decoding. The memory package can optionally include high-speed memory like DRAM to support the compute engine with access to temporary working data. As the data management operations are within the memory package, the bandwidth available to the compute engine can be much higher than the toggle mode (TM) bandwidth available outside of the memory package.

Figure 13A:
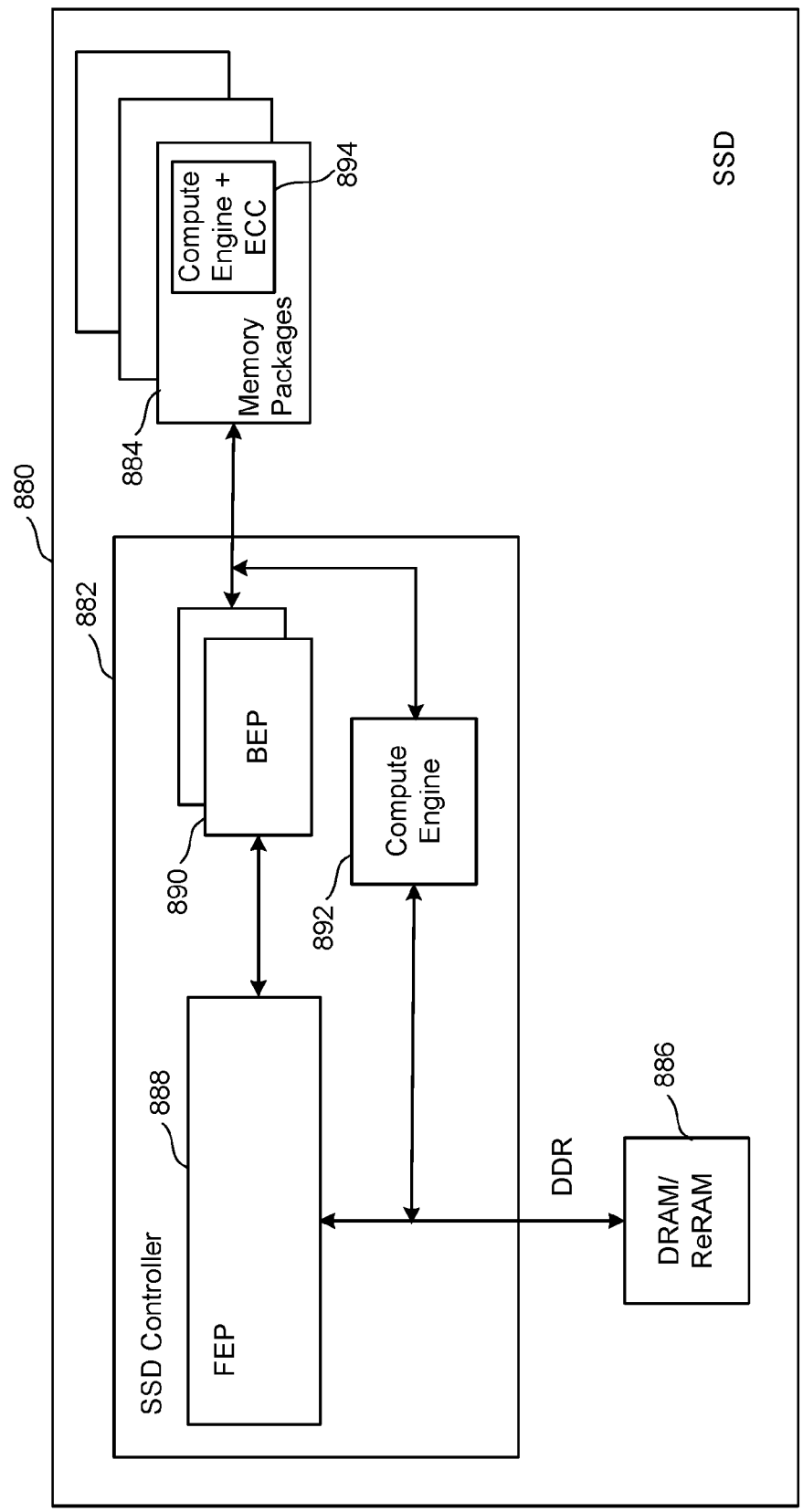
FIG. 13A is a block diagram of one embodiment of a solid state drive that comprises a Controller, non-volatile memory for storing data and a compute engine near the location of the data that can be used to perform common data manipulation operations.

FIG. 13A is a block diagram of one embodiment of a solid state drive 880 that includes controller 882, non-volatile memory packages 884 for storing data, and DRAM/ReRAM 886. Controller 882 includes FEP circuit 888 connected to one or more BEP circuits 890. The one or more BEP circuits 890 connect to the non-volatile memory packages 884. One example of FEP circuit 888 is depicted in FIG. 9. One example of BEP circuit 890 is depicted in FIG. 4. The embodiment depicted in FIG. 13A includes multiple (or distributed) compute engines, such that compute engine 892 is positioned in controller 882 and a set of compute engines (with built-in ECC engine) 894 are positioned in non-volatile memory packages 884. For example, compute engine 892 is a standalone ASIC that is connected directly to the toggle mode (TM) channels from the BEP circuits (the interface between the BEP circuits and the memory packages/die). Compute engine 892 can also be connected to the high speed, high-bandwidth DRAM memory 886 through a standard DDR interface to the DRAM/ReRAM chip and to FEP circuit 888. Compute engine 894 is integrated with each memory package. In one embodiment, the memory package also includes an ECC engine (or at least the decoder portion of the ECC engine) to decode code words read from the memory and to correct the data read from the non-volatile memory die before being processed by the compute engine. Thus, compute engine 894 includes an ECC engine. In other embodiments, the compute engine can operate on data that has not been subjected to ECC decoding. The memory package can optionally include high-speed memory like DRAM to support the compute engine with access to temporary working data. As some data manipulation operations are within the memory package, the bandwidth available to the compute engine can be much higher than the toggle mode (TM) bandwidth available outside of the memory package. In some embodiments, the compute engines 892 and 894 will split up the work performed on the data. For example, code from the hosts can program the system to perform some operations on compute engine 892 and other operations on compute engine 894. For instance, the compute engine 894 could perform error correction coding (ECC) function along with simple application level tests, and the compute engine 892 could be executing a flash translation layer (FTL) optimized for sequential or indexed-sequential workloads, along with more complex filtering, sorting and grouping functions at the application query level.

Figure 14:
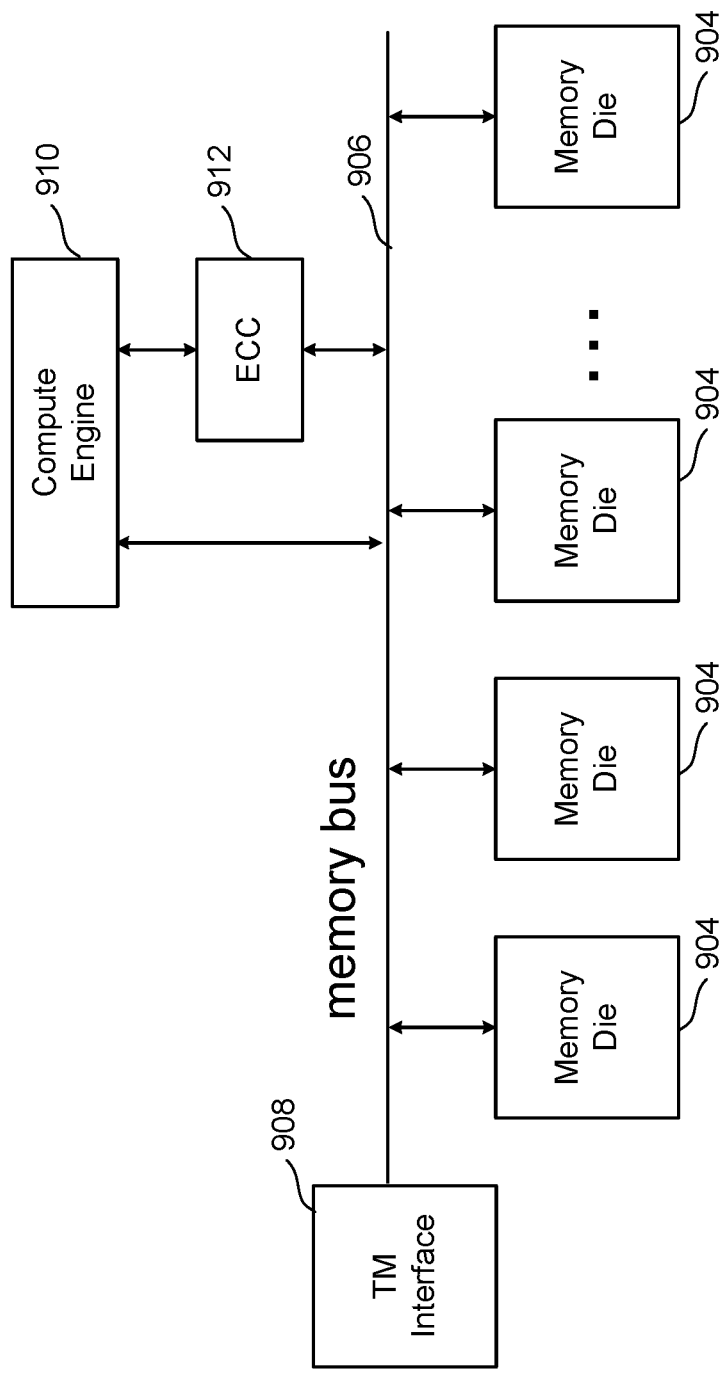
FIG. 14 is a block diagram of one embodiment of a memory package with a compute engine.

FIG. 14 is a block diagram of one embodiment of a memory package that includes a compute engine. The embodiment of 14 can be used to implement one of the memory packages 854 in FIG. 13 or memory packages 884 of FIG. 13A. The memory package of FIG. 14 includes a plurality of memory die 904 connected to a memory bus 906 (analogous to the memory bus of FIG. 5). Memory bus 906 is connected to a TM interface 908 for communicating with an BEP circuit. Additionally, FIG. 14 shows a compute engine 910 connected to the memory bus and to an ECC engine 912. The ECC engine 912 is also connected to memory bus 906. Memory read from a memory die can be subjected to ECC decoding (including fixing errors) and then presented to the compute engine 910 to perform any of the compute operations discussed herein.

Figure 15:
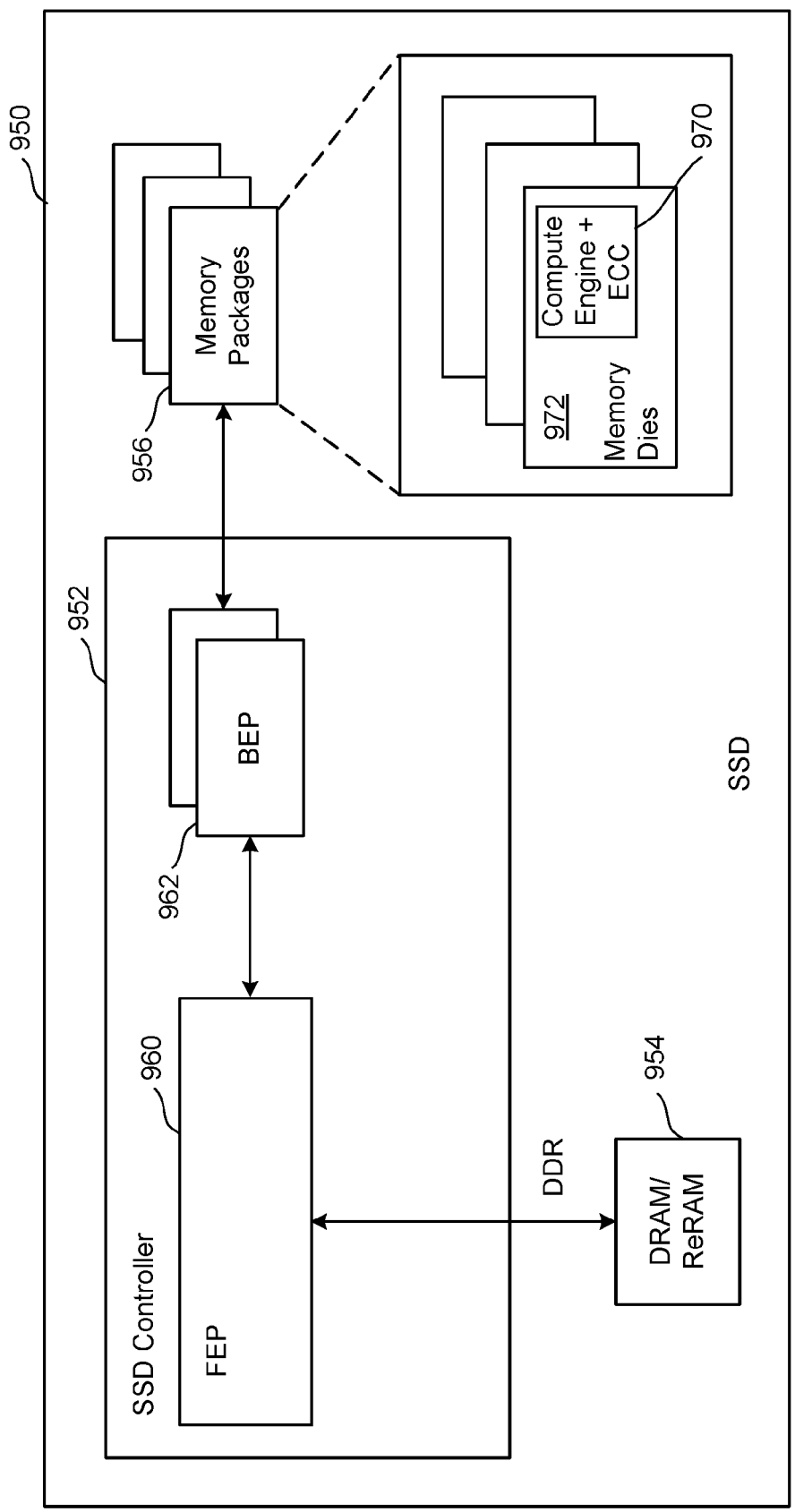
FIG. 15 is a block diagram of one embodiment of a solid state drive that comprises a Controller, non-volatile memory for storing data and a compute engine near the location of the data that can be used to perform common data manipulation operations.

FIG. 15 is a block diagram of one embodiment of a solid state drive 950 that comprises a controller 952, non-volatile memory packages 956 for storing data, DRAM/ReRAM 954, and a compute engine near the location of that data that can be used to perform common data manipulation operations. Controller 952 includes FEP circuit 960 connected to one or more BEP circuits 962. The one or more BEP circuits 962 connect to the non-volatile memory packages 956. One example of FEP circuit 960 is depicted in FIG. 9. One example of BEP circuit 962 is depicted in FIG. 4. The embodiment of FIG. 15 implements memory package level integration. For example, each memory package includes multiple memory die and a compute engine 970 integrated within each memory die 972. In one embodiment, the compute engine will include an ECC engine to decode (including correcting) data read from the memory die. The ECC engine can be part of the compute engine or separate from the compute engine but otherwise included in the memory die.

Figure 16:
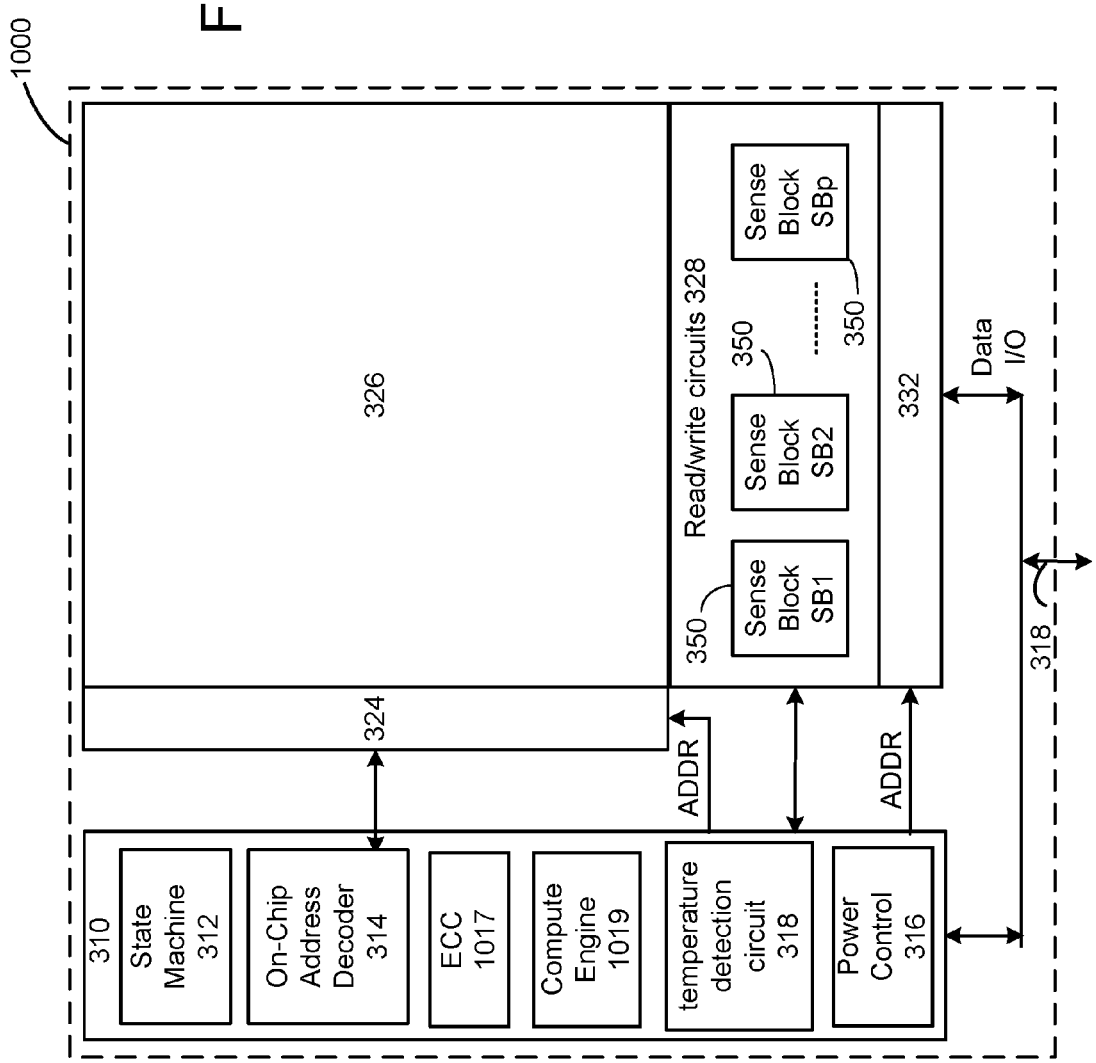
FIG. 16 is a block diagram of one embodiment of a memory die with a compute engine.

FIG. 16 is a block diagram of one embodiment of a memory die 1000 that includes a compute engine. For example, the memory die 1000 is an example implementation of memory die 972 of FIG. 15. The embodiment of FIG. 16 includes the elements of the embodiment of FIG. 6. For example, memory die 1000 includes a three dimensional memory structure 326 of memory cells (such as, for example, a 3D array of memory cells), control circuitry 310, read/write circuits 328, row decoder 324 and column decoder 332. Control circuitry 310 includes state machine 312, on-chip address decoder 314, a power control module 316 and a temperature detection circuit 318. Additionally, in the embodiment of FIG. 16, control circuitry 310 further includes ECC engine 1017 and compute engine 1019. Data read from the memory structure 326 is decoded using ECC engine 1017 and provided to compute engine 1019 for performing various compute operations, as discussed herein.

While the embodiments discussed above show the SSD controller to be implemented as a two ASIC solution containing a BEP ASIC and a FEPASIC, it is also possible that the SSD controller is implemented with more or less than two ASICs. In that case, the design space can be expanded to place the compute engine within any one or more of the ASICs. Additionally, the compute engine can be placed outside of the ASICs. In other embodiments, the SSD controller can include different architectures, other than the FE/BEP architecture. Even in the other architectures, the SSD controller can still be configured to include a compute engine inside one of the ASICs or circuits or modules. Additionally, a compute engine can be added to SSDs that are not implemented using ASICs, but implemented using other hardware.

Figure 17:
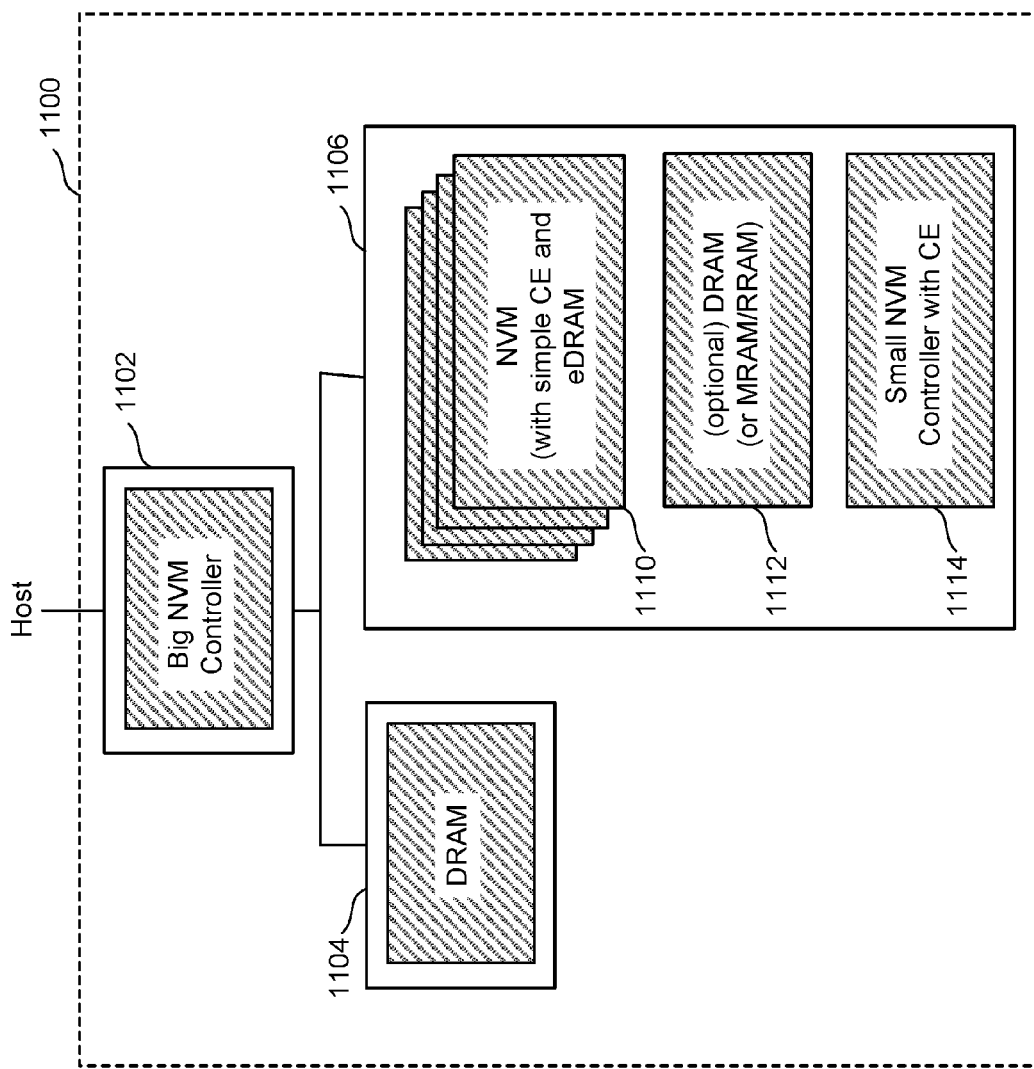
FIG. 17 is a block diagram of one embodiment of a solid state drive that comprises a Controller, non-volatile memory for storing data and a compute engine near the location of the data that can be used to perform common data manipulation operations.

The embodiment of FIG. 15 includes integrating the compute engine within the memory die (such as a NAND memory die or ReRAM memory die). FIG. 17 is a block diagram providing additional details for implementing an embodiment of the system of FIG. 15. Specifically, FIG. 17 shows a host in communication with a SSD 1100 (implemented on a printed circuit board) that includes a Big NVM controller 1102 and a Small NVM controller 1114. The Big NVM controller 1102 is in communication with DRAM 1104 and memory package 1106.

In one embodiment, memory package 1106 includes several memory die 1110, optional DRAM (or MRAM/RRAM/PCM/eDRAM) 1112, and Small NVM Controller 1114. Each of the memory die 1110 has an on die compute engine (CE). In one embodiment the on die compute engine is implemented using CMOS technology on the top surface of a substrate and under the monolithic three-dimensional memory array. Potentially, eDRAM/STT-MRAM/PCM as well as SRAM can be integrated. The on die compute engine (CE) can perform some of the data manipulation operations.

In one embodiment, Small NVM Controller 1114 includes a compute engine (CE) that can perform some of the data manipulation operations. Small NVM Controller 1114 can communicate with the internal memory dies and external chips (i.e. Big NVM controller and DRAM in FIG. 17). Optional DRAM 1112 is used for the Small NVM Controller 1114 to store working data sets. By off-loading computation from the Big NVM Controller 1102 to Small NVM controller with a computer engine (CE) 1114 and the simple CE of the memory die 1110, the external DRAM requirement and communication overhead can be reduced.

FIG. 17 shows that each of Big NVM Controller 1102, DRAM 1104, memory die 1110, DRAM 1112 and Small NVM Controller 1114 can be implemented on separate silicon die in three different packages mounted on one printed circuit board. Thus, FIG. 17 provides a big and small NVM controller architecture. The Big NVM Controller 1102 interfaces with the host and DRAM. The Small NVM Controller 1114 can be inside any of the memory packages. The Small NVM Controller 1114 includes a computational engine with optional DRAM and manages multiple NVM channels. A mapping table can be stored in the optional DRAM (or MRAM/PRAM).

Figure 18:
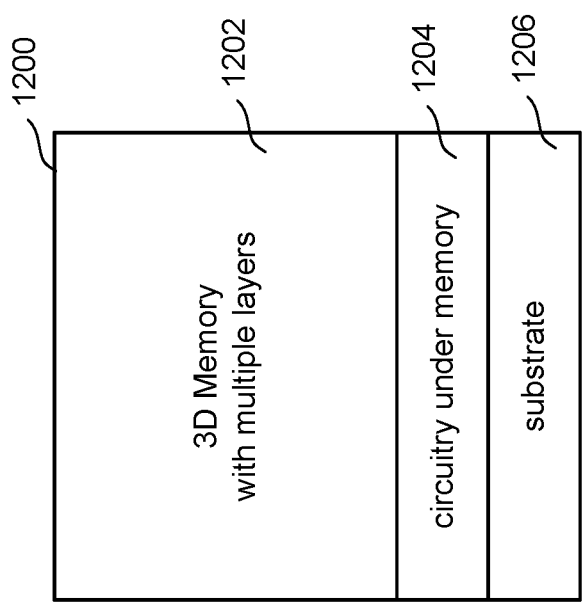
FIG. 18 is a block diagram of one embodiment of a memory die with circuitry under the memory array.

FIG. 18 is a block diagram of one embodiment of a memory die 1200 with circuitry under the memory array. FIG. 18 shows a monolithic three-dimensional memory structure 1202 with multiple layers. Underneath the memory structure 1202 is circuitry 1204 that is implemented on the top surface of the substrate 1206 and under the memory array 1202. In one embodiment, the circuitry 1204 is implemented using CMOS technology. For example, simple computational logic can be integrated in the CMOS logic under the memory array 1204 potentially with eDRAM/STT-MRAM/PCM as well as SRAM/latches. Simple circuitry logic (i.e., randomizer, ID generator, PUF, or AES) and simple error management logic (i.e., error location map or a simple error avoiding algorithm such as read reference optimizer) as well as ECC can be integrated in the CMOS logic under the memory array 1202 as examples of the compute engine discussed above. This improves latency and performance by eliminating data transfer overhead from the memory die to the separate controller die. An FPGA could be integrated, supporting multiple configurations with a single system on a chip as an aforementioned compute engine. An FPGA can be integrated, supporting multiple configurations within a system on a chip.

Figure 19:
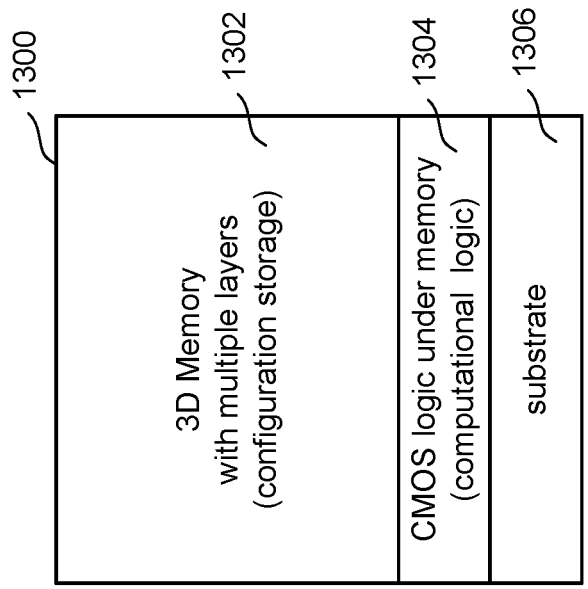
FIG. 19 is a block diagram of one embodiment of a memory die with circuitry under the memory array.

Additionally, other functions can be integrated as an aforementioned compute engine. For example, a CPU or parallel computational engine can be integrated as an aforementioned compute engine. An SIMD engine ("GPU"), neural network, DSP engine (e.g., image/audio processing), digital logic operation (multiplication, addition, subtraction, XOR, etc.), data mining (apriori, k-means, pagerank, decision tree) or pattern matching (i.e., Hamming distance calculation), FPGA fabric supporting multiple configurations in the memory die, high speed I/O circuits with memory equalizers, circuits for optical or capacitor/inductive coupling based on interconnections can also be used. In one embodiment, the compute engine needs to be able to work with encrypted data when AES is bypassed for specific applications. In some embodiments, the compute engine may need to work with erroneous data when ECC is bypassed for specific applications FIG. 19 is a block diagram of one embodiment of a memory die 1300 with circuitry 1304 under the memory array 1302 for using the non-volatile memory die 1300 as a non-volatile-FPGA. The memory die 1300 will include a three-dimensional monolithic memory array 1302. Implemented on the top surface of the substrate 1306, and under the memory array 1302, will be CMOS logic 1304 that implements a FPGA to be used as a compute engine (per the discussion above). This system will use the memory array 1302 (NAND or other type of non-volatile memory) as configuration storage for the reconfigurable logic 1304 of the FPGA. That is, configuration data stored in memory array 1302 is used to configure the FPGA's. This will make the FPGA non-volatile. This will allow for fast boot up compared to conventional FPGAs, which require a reading of configuration data from a discrete nonvolatile memory device to the volatile FPGA cell array. When the FPGA (hardware accelerator/compute engine) is not needed, the configuration storage (the memory array) can be used as just normal non-volatile storage, saving idle power.

One embodiment includes a non-volatile storage system, comprising: a controller and a memory package separate from and connected to the controller. The memory package includes: one or more non-volatile memory dies, a compute engine configured to perform data manipulation operations on contents of data stored in the memory package, and an error correction engine.

In some example embodiments, the controller is configured to expose an application programming interface that can be used by a host application to perform data manipulation operation by the compute engine on contents of data stored in the memory package and the controller is configured to transfer command and data between the controller and the memory package. In some implementations, the error correction engine is configured to decode data stored in the memory package and present the decoded data to the compute engine for the compute engine to perform data manipulation operations on the decoded data. In some implementations, the compute engine is configured to search a stream of data stored in the memory package and the compute engine is configured to sort a stream of data stored in the memory package in nan order specified by the host application.

One embodiment includes a non-volatile storage system, comprising: a front end processor circuit; a back end processor circuit connected to the front end processor circuit; a non-volatile memory package connected to the back end processor circuit; and a compute engine inside the non-volatile storage system configured to perform operations on data stored in the non-volatile memory package.

One embodiment includes a non-volatile storage system, comprising: a controller comprising a front end processor circuit connected to a back end processor circuit; and a non-volatile memory package connected to the back end processor circuit, the non-volatile memory package comprises means for decoding and performing operations on data stored in the non-volatile memory package.

One embodiment includes a method of operating non-volatile storage system, comprising: interfacing with a host, the interfacing being performed by a controller; accessing data in a non-volatile memory package in response to the controller, the memory package is separate from and connected to the controller, the memory package includes one or more non-volatile memory dies, a compute engine and an error correction engine; decoding the accessed data using the error correction engine of the memory package; and performing data operations on the decoded data using the compute engine of the memory package. In various alternatives, the compute engine and the error correction engine are positioned on a memory die, the compute engine and the error correction engine are positioned on off of the memory die and on a printed circuit board, the controller comprises a front end processor circuit and a back end processor circuit connected to the front end processor circuit, the back end processor circuit is positioned in the memory package, the controller performs just-in-time compiling of code from the host to machine code of the compute engine.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-volatile storage system, comprising:
   a controller; and
   a memory die, the memory die includes:
      a substrate;
      a monolithic three dimensional non-volatile memory structure in which multiple memory levels are formed as part of the memory die above the substrate with no intervening substrates between the memory levels;
      a compute engine configured to perform data manipulation operations on contents of data stored in the memory structure, and
      an error correction engine, the compute engine and the error correction engine are implemented on a top surface of the substrate and below the memory structure of the memory die.

2. The non-volatile storage system of claim 1, wherein:
   the controller is configured to expose an application programming interface that can be used by a host application to perform data manipulation operations by the compute engine on contents of data stored in the memory structure; and
   the controller is further configured to transfer commands between the controller and the compute engine.

3. The non-volatile storage system of claim 2, wherein:
   the error correction engine is configured to decode data stored in the memory die and present the decoded data to the compute engine for the compute engine to perform data manipulation operations on the decoded data.

4. The non-volatile storage system of claim 2, wherein:
   the compute engine is further configured to search a stream of data stored in the memory structure; and
   the compute engine is further configured to sort a stream of data stored in the memory structure in an order specified by the host application.

5. The non-volatile storage system of claim 1, wherein:
   the compute engine is implemented by a plurality of non-volatile FPGA's that are configured by the non-volatile memory structure.

6. The non-volatile storage system of claim 1, wherein:
   the controller comprises a front end processor circuit and a back end processor circuit connected to the front end processor circuit, the memory die is connected to the back end processor circuit.

7. The non-volatile storage system of claim 6, wherein:
   the front end processor circuit is configured to implement a flash translation layer including performing memory management, logical to physical address translation, communication with a host, management of local volatile memory and management of operation of the non-volatile storage system.

8. The non-volatile storage system of claim 6, wherein:
   the back end processor circuit is configured to manage memory operations in the memory die at the request of the front end processor circuit, including programming, reading and erasing the memory die.

9. The non-volatile storage system of claim 6, further comprising:
   additional back end processor circuits; and additional memory dies, each of the additional back end processor circuits communicate with the front end processor circuit and one or more of the additional memory dies; and wherein the front end processor circuit is a master for the back end processor circuit and the additional back end processor circuits, the back end processor circuit is a slave circuit for the front end processor circuit, the additional back end processor circuits are slave circuits for the front end processor circuit.

10. The non-volatile storage system of claim 6, wherein:
the controller includes a local volatile memory and an additional compute engine, the additional compute engine is connected to the local volatile memory and an interface between the back end processor circuit and the memory die.

11. The non-volatile storage system of claim 6, wherein the front end processor circuit includes an interface to a host, the compute engine is positioned on the storage system side of the interface to the host.

12. The non-volatile storage system of claim 1, wherein:
the controller includes an additional compute engine.

13. The non-volatile storage system of claim 12, wherein:
the additional compute engine is configured to execute a flash translation layer.

14. A non-volatile storage system, comprising:
a front end processor circuit configured to communicate with a host and perform logical to physical address translation;
a first back end processor circuit connected to the front end processor circuit;
a second back end processor circuit connected to the front end processor circuit;
a plurality of memory dies comprising a first set of memory dies connected to the first back end processor circuit via a first physical interface and a second set of memory dies connected to the second back end processor circuit via a second physical interface; and
a compute engine inside the non-volatile storage system and in communication with the front end processor circuit, the compute engine is configured to perform operations on data stored in the plurality of memory dies.

15. The non-volatile storage system of claim 14, wherein:
the compute engine is positioned in the front end processor circuit.

16. The non-volatile storage system of claim 14, wherein:
the compute engine is positioned in the first back end processor circuit.

17. The non-volatile storage system of claim 14, wherein:
the compute engine is positioned in a memory die of the plurality of memory dies.

18. The non-volatile storage system of claim 14, wherein:
the front end processor circuit includes an interface to a host, the compute engine is positioned on the storage system side of the interface to the host.

19. The non-volatile storage system of claim 14, further comprising:
a local volatile memory,
wherein the compute engine is connected to the local volatile memory and an interface between the first back end processor circuit and the first set of memory dies, the front end processor circuit is connected to the local volatile memory, the front end processor circuit is configured to manage the local volatile memory, and the compute engine is in communication with the local volatile memory.

20. The non-volatile storage system of claim 14, wherein:
the compute engine is connected between the first back end processor circuit and the front end processor circuit.

21. A non-volatile storage system, comprising:
a local volatile memory;
a front end processor circuit connected to the local volatile memory, the front end processor circuit includes a first processor, the front end processor circuit is configured to communicate with a host and manage the local volatile memory;
a first back end processor circuit connected to the front end processor circuit, the first back end processor circuit comprising a second processor separate from the first processor;
a second back end processor circuit connected to the front end processor circuit, the second back end processor circuit comprising a third processor separate from the first processor and the second processor;
non-volatile memory including a first subset of the non-volatile memory connected to the first back end processor circuit and a second subset of the non-volatile memory connected to the second back end processor circuit; and
a compute engine inside the non-volatile storage system and in communication with the local volatile memory and the front end processor circuit, the compute engine is configured to perform operations on data stored in the non-volatile memory using the local volatile memory.

22. The non-volatile storage system of claim 21, wherein:
the compute engine is connected to the first back end processor circuit, the front end processor circuit and the local volatile memory.

23. The non-volatile storage system of claim 21, wherein:
the front end processor circuit further includes an interface to a host, the compute engine is positioned on the storage system side of the interface to the host.

24. The non-volatile storage system of claim 21, wherein:
the compute engine is positioned outside of the front end processor circuit, the first back end processor circuit, the second back end processor circuit and the non-volatile memory.

25. The non-volatile storage system of claim 21, wherein:
the compute engine is positioned in the front end processor circuit.

* * * * *